United States Patent
Ma et al.

(10) Patent No.: US 11,002,594 B2
(45) Date of Patent: May 11, 2021

(54) METHOD AND APPARATUS FOR DISTRIBUTED SENSING

(71) Applicants: SENTEK Instrument, LLC, Blacksburg, VA (US); Lingmei Ma, Blacksburg, VA (US); Bo Dong, Blacksburg, VA (US); Anbo Wang, Blacksburg, VA (US)

(72) Inventors: Lingmei Ma, Blacksburg, VA (US); Bo Dong, Blacksburg, VA (US); Anbo Wang, Blacksburg, VA (US)

(73) Assignee: Sentek Instrument, LLC, Blacksburg, VA (US)

( * ) Notice: Subject to any disclaimer, the term of this patent is extended or adjusted under 35 U.S.C. 154(b) by 325 days.

(21) Appl. No.: 15/776,246

(22) PCT Filed: Nov. 18, 2016

(86) PCT No.: PCT/US2016/062756
§ 371 (c)(1),
(2) Date: May 15, 2018

(87) PCT Pub. No.: WO2017/087792
PCT Pub. Date: May 26, 2017

(65) Prior Publication Data
US 2020/0249075 A1    Aug. 6, 2020

Related U.S. Application Data

(60) Provisional application No. 62/362,822, filed on Jul. 15, 2016, provisional application No. 62/303,315, (Continued)

(51) Int. Cl.
| | | |
|---|---|---|
| *G01H 9/00* | (2006.01) | |
| *G01D 5/353* | (2006.01) | |
| *G02B 26/04* | (2006.01) | |

(52) U.S. Cl.
CPC ......... *G01H 9/004* (2013.01); *G01D 5/35361* (2013.01); *G02B 26/04* (2013.01)

(58) Field of Classification Search
CPC ..... G01H 9/004; G01D 5/35361; G02B 26/04
See application file for complete search history.

(56) References Cited

U.S. PATENT DOCUMENTS

| | | | | |
|---|---|---|---|---|
| 5,095,487 A | * | 3/1992 | Meyerhofer | ......... H01S 3/0057 |
| | | | | 372/102 |
| 5,194,847 A | * | 3/1993 | Taylor | ................... G01H 9/004 |
| | | | | 340/541 |

(Continued)

*Primary Examiner* — Dominic J Bologna
(74) *Attorney, Agent, or Firm* — W&C IP

(57) ABSTRACT

Forming a light pulse having a plurality of time-dependent frequency components such as a chirped light pulse or a light pulse group and superposing reflected light from different portions of an optical fiber allows detection of changes in effective optical path differences due to physical parameters in the environment of the optical fiber by sensing the optical interference pattern of each light frequency and wavelength. The development of a plurality of interference patterns from each light pulse provides sufficient information for robust demodulation by known methods to produce signals having good fidelity to variations in the physical parameters of interest, particularly vibrations and acoustic waves. The location of the measured physical parameter along the optical fiber can be determined from the time difference between injecting the light pulse and detection of a reflection or Rayleigh backscattering and diffraction index of the optical fiber.

20 Claims, 17 Drawing Sheets

Related U.S. Application Data filed on Mar. 3, 2016, provisional application No. 62/257,835, filed on Nov. 20, 2015.

(56) References Cited

U.S. PATENT DOCUMENTS

| | | | |
|---|---|---|---|
| 2008/0057296 A1 | 3/2008 | Dry | |
| 2010/0067018 A1* | 3/2010 | Crickmore | G01D 5/35383 356/477 |
| 2010/0321702 A1* | 12/2010 | Froggatt | G01M 11/083 356/450 |
| 2012/0067118 A1* | 3/2012 | Hartog | G01D 5/35361 73/152.16 |
| 2012/0188533 A1* | 7/2012 | Crickmore | G01H 9/004 356/73.1 |
| 2014/0152995 A1* | 6/2014 | Dong | G01D 18/00 356/477 |
| 2015/0002850 A1* | 1/2015 | Vogler | G01B 9/02014 356/479 |
| 2015/0036147 A1* | 2/2015 | Xiao | G01D 5/35312 356/480 |
| 2017/0074688 A1* | 3/2017 | Crickmore | G01K 11/3206 |
| 2017/0292862 A1* | 10/2017 | Godfrey | G01R 33/0327 |
| 2018/0252575 A1* | 9/2018 | Wang | G01H 9/004 |
| 2019/0025094 A1* | 1/2019 | Lewis | G01D 5/35361 |

\* cited by examiner

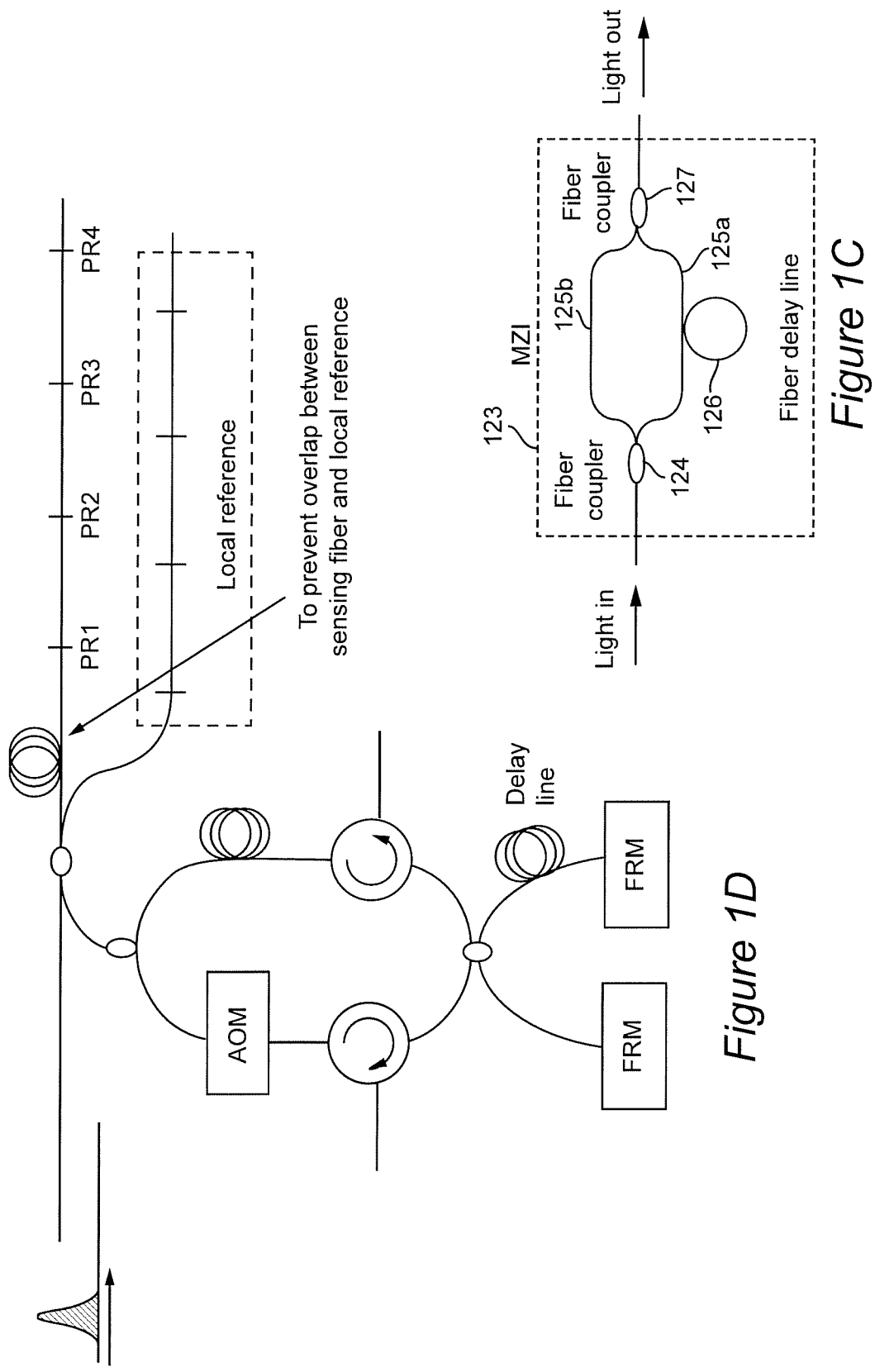

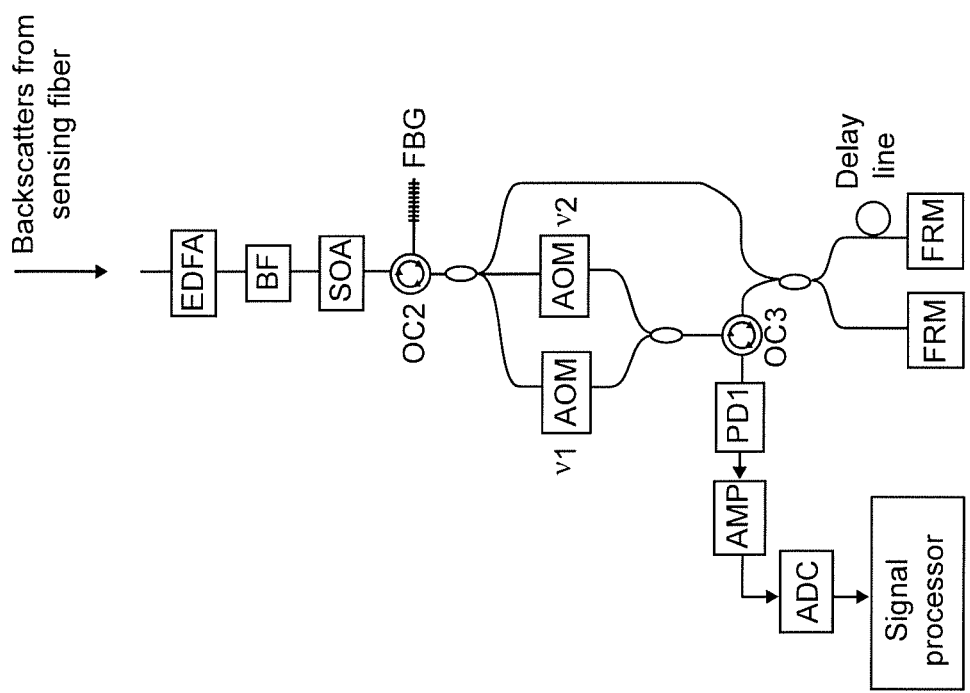

METHOD AND APPARATUS FOR DISTRIBUTED SENSING

DESCRIPTION

Field of the Invention

The present invention generally relates to remote, distributed optical telemetry of physical parameters and, more particularly, to distributed acoustic sensing capable of rapid detection and location of sources of vibration and other forms of acoustic energy as well as additional parameters and conditions.

Background of the Invention

The sensing of physical parameters such as temperature, pressure and strain (e.g. induced by a physical force such as flow rate) using optical elements that exhibit a dimensional change in response to those parameters has become a mature technology due to high accuracy, robustness of sensors in hostile environments and extreme conditions potentially very small sensor size for compatibility with many diverse applications and the distance over which such telemetry can be conducted using optical fibers. In recent years, arrangements have been devised to provide an array of such sensors in or on a single optical fiber for distributed sensing of physical parameters such as those alluded to above. However, such arrays engender some degree of complexity in distinguishing the responses of individual sensors in an array and tracking changes in the measured parameters. This difficulty is particularly pronounced when seeking to measure vibration or acoustic waves.

Distributed acoustic sensing is desirable in a wide range of applications such as seismological imaging for oil and gas exploration, oil or gas downwell multiphase flow rate measurement, intrusion detection, surveillance, pipeline leakage detection civil structural health monitoring and the like. Many systems have thus been developed for such applications and a number have exploited the properties of fiber optic technologies based on optical time domain reflectometry for making such distributed vibration or acoustic measurements.

One class of such systems is based on the injection of a single coherent optical pulse and detection of the coherent Rayleigh noise (CRN) which is essentially the result of optical interference between Rayleigh backscatter energy originated from different parts of the incident optical pulse. A somewhat similar class of systems uses a partially coherent optical pulse generated by direct current modulation of a laser diode. The direct current modulation causes variation in wavelength over time (referred to as "chirp") during the laser pulse. The detected pulse is then filtered by a narrow bandwidth fiber Bragg grating (FBG) prior to photodetection. In this class of system, the partially coherent laser pulse is believed to reduce non-linear effects in the optical fiber that may limit the peak power of the laser pulse in a single mode sensing fiber. Therefore, use of a partially coherent laser pulse allows greater optical power to be injected into the optical fiber and serves to enhance the signal-to-noise ratio (SNR).

Another class of system utilizes either a single laser pulse or two laser pulses of the same frequency that are originated from the same laser pulse but separated in time injected into a single mode optical fiber. In the case of a single laser pulse, a Michelson interferometer (MI) that uses a M×M fiber coupler where M≥3 is used to demodulate the sensing (e.g. return) signal. When two laser pulses are injected, a 3×3 fiber coupler is used to demodulate the signal, which is the phase information. Various heterodyne detection arrangements can also be used for detection of an acoustic or vibrational disturbance of the optical fiber.

Yet another class of system uses two laser pulses of different optical frequencies or wavelengths which are launched into a sensing fiber. Raleigh backscattering is detected to resolve vibration along the sensing fiber. Other somewhat similar systems utilize heterodyne detection of Raleigh backscattering to resolve phase information. In such systems, part of the laser emission of a source is tapped to interfere with the much weaker Rayleigh backscatters to improve quality of phase information.

All of these known classes of acoustic or vibration detectors suffer from several common limitations. That is, all of these systems are limited to measurement of relative optical phase and are incapable of measuring absolute phase. Therefore such systems are only useful for detection of dynamic events such as vibration, voice and rapid change of temperature. Further, all of these systems are based on detection of Rayleigh backscattering which is very weak and highly irregular which limits sensitivity and often limits measurement to qualitative detection and causes significant harmonics to be present in the output signal that may compromise detection of qualities and parameters of the detected vibration or acoustic wave that may be of interest. Therefore, these types of system are applicable only to vibration or acoustic waves and not other parameters that could be measured.

SUMMARY OF THE INVENTION

It is therefore an object of the present invention to provide a fiber optic measurement technology which provides distributed measurement of many parameters including vibration and acoustic waves, temperature, strain, magnetic and/or electrical fields and some combinations thereof.

It is another object of the invention to provide apparatus and methodology capable of measurement of absolute phase as well as resolving the location of vibration and/or acoustic energy along the length of a sensing or measurement fiber of essentially arbitrary length.

It is a further object of the invention to provide an apparatus and methodology for measurement of vibration or acoustic energy using virtually any type of optical fiber (e.g. with or without spaced partial reflectors, ordinary communications grade fiber or so-called microstructure fiber having irregularities formed therein) as the measurement fiber.

In order to accomplish these and other objects of the invention, a method of measuring changes in a physical parameter is provided comprising forming a plurality of optical pulses from a single optical pulse, injecting said at least one optical pulse into a sensing or measuring optical fiber, detecting reflections or Rayleigh backscatters of light from said injected optical pulse from at least two regions of said sensing or measurement optical fiber, superimposing said reflections or Rayleigh backscatters from said at least two regions of said sensing or measurement optical fiber to cause at least two patterns of optical interference, modifying frequency or wavelength of said optical pulse over the duration of said optical pulse to form a chirped optical pulse or shifting frequency of an optical pulse of said plurality of optical pulses to form a pulse group including said single optical pulse before said injecting step or subsequent to said detecting step, and detecting said patterns of optical interference.

In accordance with another aspect of the invention, an apparatus for sensing or measuring a physical parameter comprising a length of sensing or measurement optical fiber, a light source for injecting a light pulse into the length of the sensing or measurement optical fiber, a first optical element for splitting reflections or Rayleigh backscatters from the light pulse into two separate paths, the reflections or Rayleigh backscatters containing light of at least two frequencies or wavelengths, an optical delay line for delaying the reflections or Rayleigh backscatters in one of the two optical paths to form delayed reflections or Rayleigh backscatters, and an optical element for combining the reflections or Rayleigh backscatters with the delayed reflections or Rayleigh backscatters to cause an interference pattern for each of the at least two frequencies.

In accordance with a further aspect of the invention, an interrogator for determining response of a length of sensing or measurement optical fiber to physical parameters in the environment of the sensing or measurement optical fiber, the interrogator comprising a light source for injecting a light pulse into the length of the sensing or measurement optical fiber, a first optical element for splitting reflections or Rayleigh backscatters from the light pulse into two separate paths, the reflections or Rayleigh backscatters containing light of at least two frequencies or wavelengths, an optical delay line for delaying the reflections or Rayleigh backscatters in one of the two optical paths to form delayed reflections or Rayleigh backscatters, and an optical element for combining the reflections or Rayleigh backscatters with the delayed reflections or Rayleigh backscatters to cause an interference pattern for each of the at least two frequencies.

BRIEF DESCRIPTION OF THE DRAWINGS

The foregoing and other objects, aspects and advantages will be better understood from the following detailed description of a preferred embodiment of the invention with reference to the drawings, in which:

FIGS. 13 and 14A-14B illustrate a variant forms of the embodiment of FIGS. 9 and 10, respectively, for vibration or acoustic wave detection or measurement from Rayleigh backscatters rather than using discrete partial reflectors.

DETAILED DESCRIPTION OF A PREFERRED EMBODIMENT OF THE INVENTION

Figure 1A:
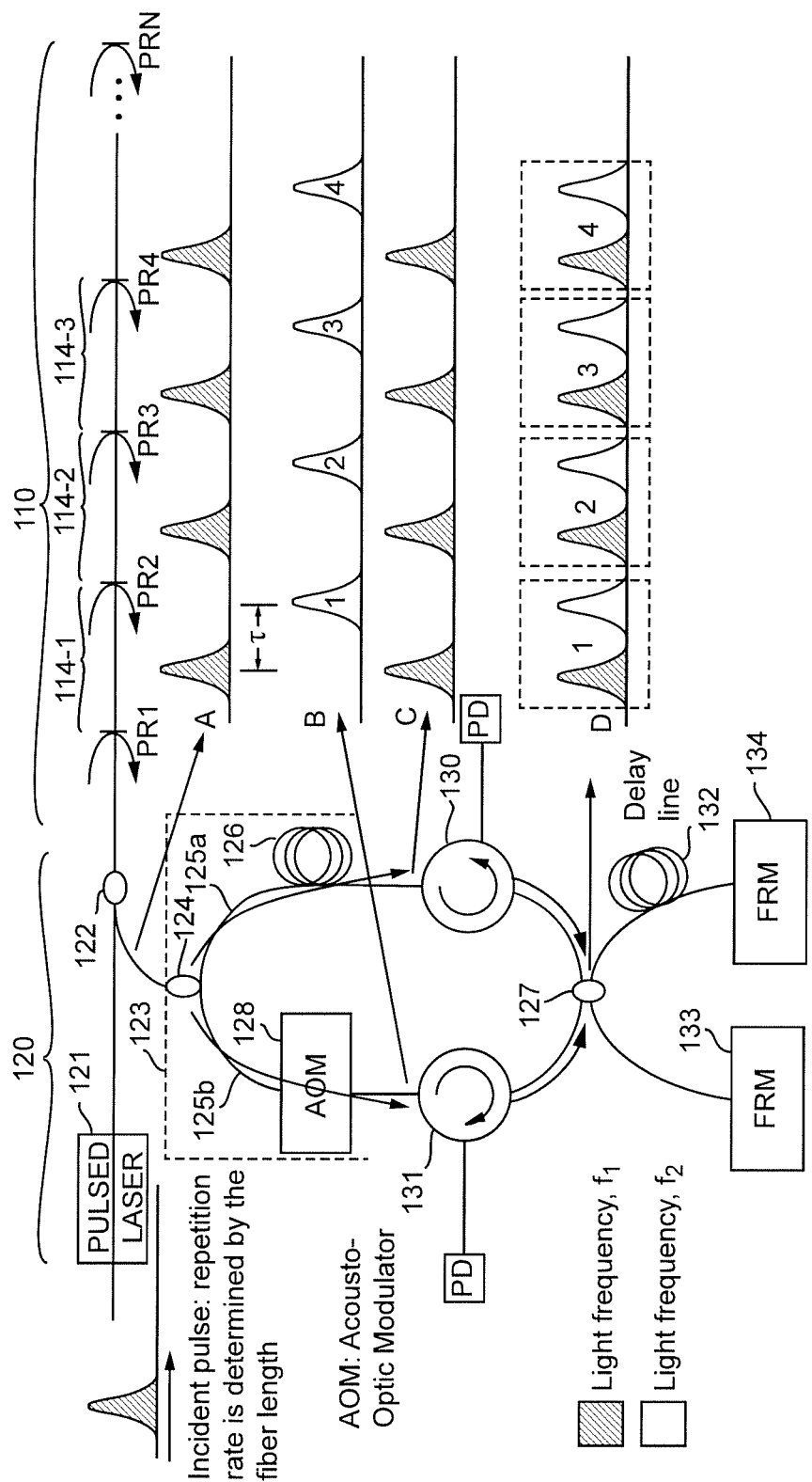
FIGS. 1A, 1AA, 1B, 1C, 1D, 2A and 2B are illustrations useful for conveying an understanding of the basic concept of the apparatus and method as applied to acoustic and vibration measurements in accordance with the invention.
Figure 1A:
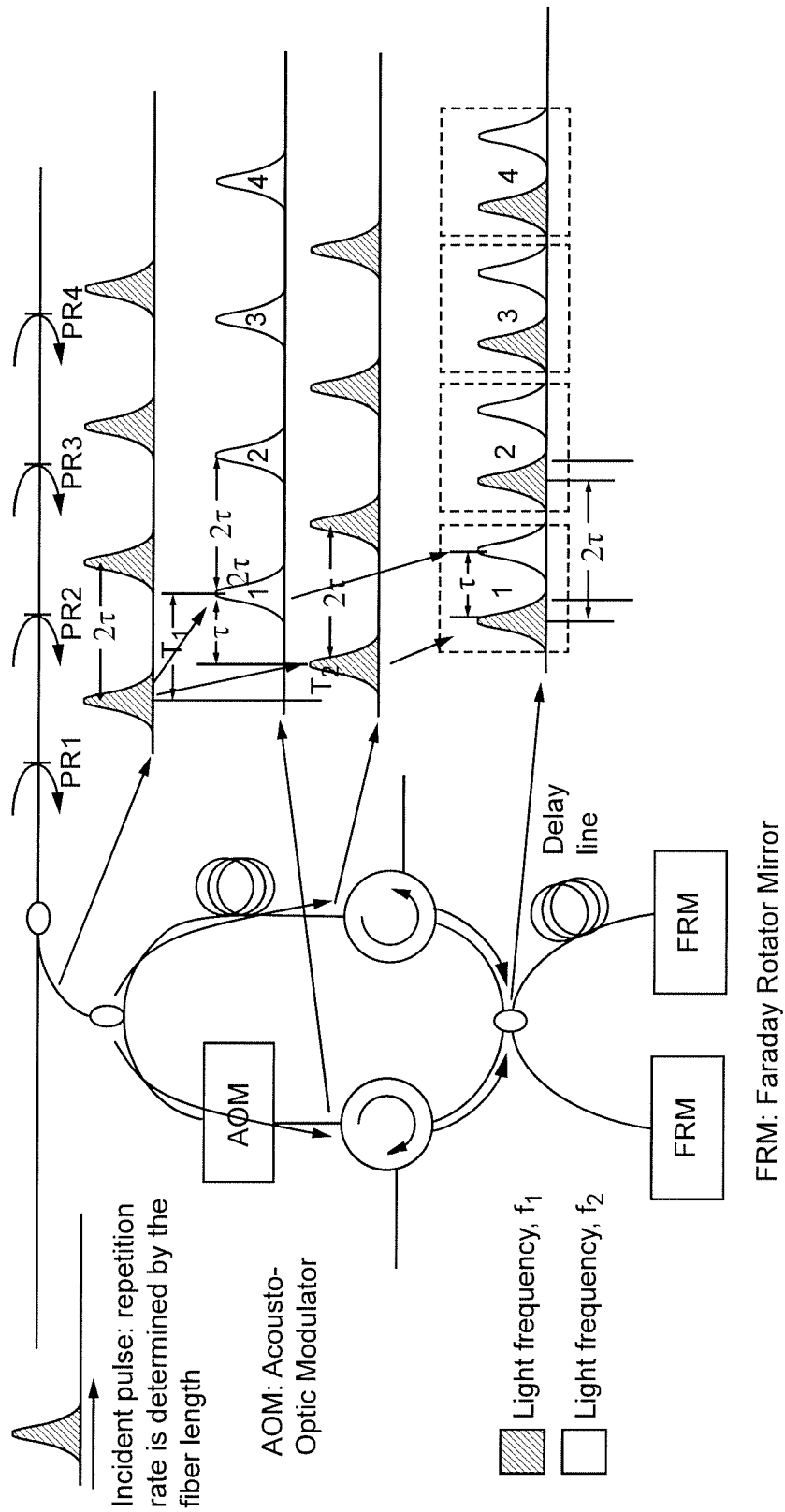

Referring now to the drawings, and more particularly to FIG. 1A, there is schematically shown a simplified and generalized embodiment of the invention including its basic elements that is useful for conveying an understanding of the basic concepts of the invention. It should be appreciated that the system illustrated in FIG. 1A has two basic portions; each portion being comprised of a particular element or combination of elements which can be respectively constituted by various optical elements having different forms as may be dictated by particular applications and which can be arranged differently in different embodiments or behaviors as will be explained in the discussion of various variant and exemplary embodiments that follows the discussion of the simplified and generalized embodiment of FIG. 1A. Other arrangements and alternative optical elements and combinations thereof that can be used to carry out the invention will also be apparent to those skilled in the art from the discussion of those variant embodiments.

The system illustrated in FIG. 1A includes two basic portions: a sensing or measurement optical fiber 110 (sometimes referred to simply as a sensing optical fiber or a measurement optical fiber) and an interrogator 120. The measurement optical fiber 110 can be any known or foreseeable type of optical fiber (e.g. with or without periodic or arbitrarily located partial reflectors or microstructures) and with or without polarization maintaining structure(s). The measurement optical fiber can be of any grade, including regular telecommunication grade fiber and may be of arbitrary length which can include an optical fiber leader to interface with the interrogator 120 if significantly separated from the region of interest for measurement. The measurement fiber, itself, may be single mode or multi-mode and may be formed of glasses, crystals, plastics or polymers or other known or foreseeable materials and may have a solid, liquid or air core. The fiber cladding may be solid and uniform or may have orderly or random holes formed therein which may be filled with air, special gases, liquids or solids and which may be chosen to maintain or change their refractive index, transmission spectrum and/or dimensions with changes in ambient conditions which may include electric fields, magnetic fields, electromagnetic radiation, chemical gases, pressure, temperature, strain and/or vibration or acoustic waves.

Figure 1B:
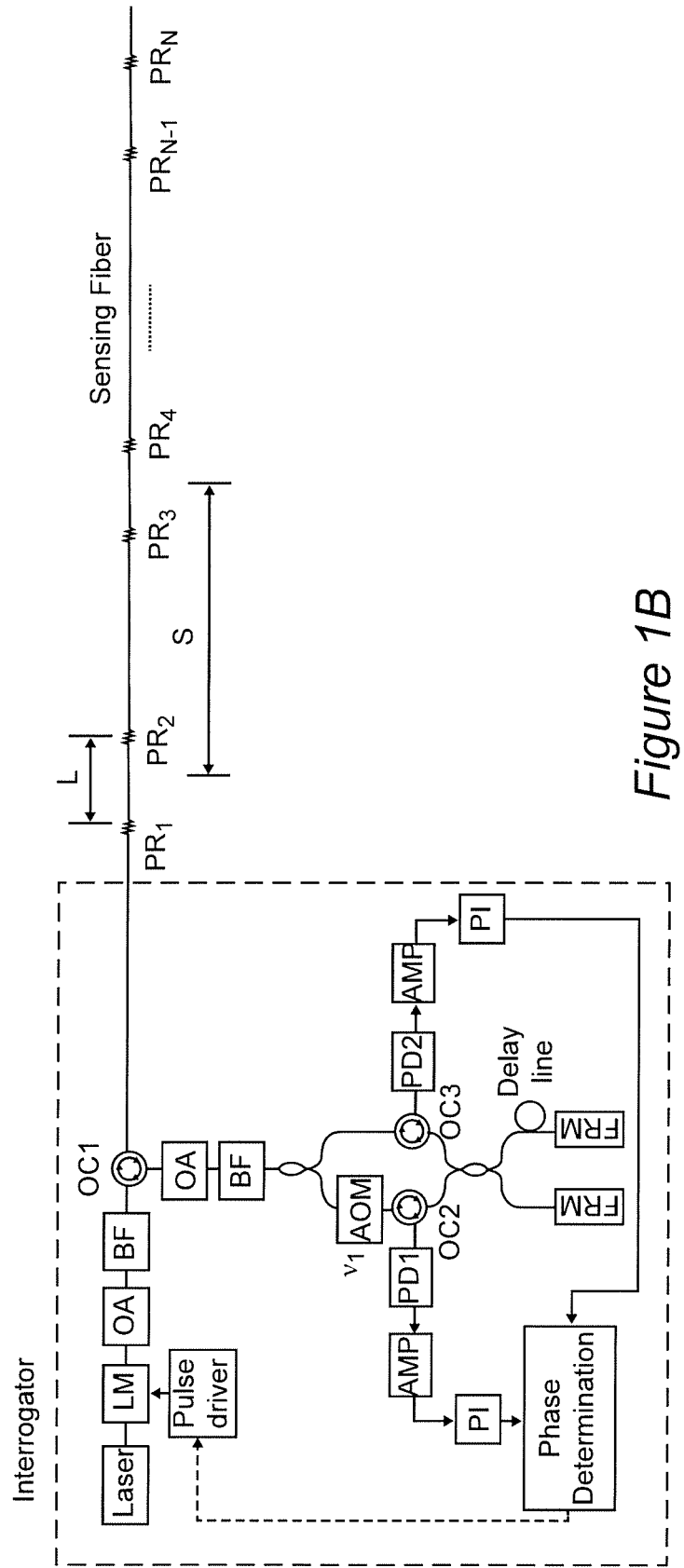

For simplicity in the discussion of the basic concept of the invention, a measurement optical fiber having regularly spaced partial reflectors (PRs) is assumed although, where partial reflectors are employed, it is only important that they be provided in pairs which may be of the same or different spacings, S, with the same or different distances, L, between the PRs of any given PR pair as shown in FIG. 1B. In the special case shown in FIG. 1A where S=L, any two consecutive PRs of the PR sequence or array (e.g. PR1-PR2, PR2-PR3, PR3-PR4 etc.) form respective pairs of PRs. Each of these pairs of PRs (whether or not regularly spaced) forms a Fabry-Perot interferometer (FPI), the optical path difference (OPD) of which is $2Ln_{eff}$ where $n_{eff}$ is the effective index of refraction of the fiber. The spacing, S, between two consecutive PR pairs may be equal to or greater than L and may be constant or varying along the sensing fiber and form an array of distributed FPIs. In the special case where S=L illustrated in FIG. 1A any two consecutive PRs form an FPI.

Each PR is designed, as will be discussed in greater detail below in regard to exemplary alternative structures, to reflect a very small portion of the optical power over a particular bandwidth of the optical spectrum incident thereon such that all of the serial PRs can "see" a sufficient portion of the optical power in order to reflect a sufficient amount of power to be sensed at the point of optical power injection while very small portions of the reflected optical power is again reflected by each of the sequence of PRs as the reflected power propagates back toward the injection point. The reflection strengths (e.g. the fraction of the incident optical power that is reflected) can be designed to be the same, similar to each other or significantly different from each other (e.g. having different reflection wavelengths and/or bandwidths) depending on the measurement fiber length and total number of PRs included in the measurement optical fiber, which may number in the thousands for long measurement optical fibers. The reflection signal bandwidth is generally designed to be able to effectively reflect some spectral portion of the incident light under all conditions (e.g. pressure, temperature, strain, etc.) to which the measurement fiber is to be subjected for a given application, whether or not one or more of those particular conditions are to be measured.

The other portion of the apparatus in accordance with the invention is an interrogator 120 for interrogating the measurement optical fiber 110 to determine particular conditions along its length. Interrogator 120 comprises a preferably pulsed laser 121, a 2×1 optical coupler 122 for coupling optical power into and out of the measurement optical fiber 110, a modified Mach-Zehnder interferometer (MZI) 123 (a basic and unmodified form of which is illustrated in FIG. 1C for reference), an optical delay line 132 and Faraday rotator mirrors 133 and 134. (An optical circulator, a 2×2 optical coupler or even an M×N optical coupler can be used in-place of the 2×1 optical coupler as shown in FIG. 1D. In such a case, some reference reflectors can be placed in the additional arm to provide compensation for environmental conditions as will be discussed in more detail below. It is also preferred in such a case, to add a fiber delay length as shown in FIG. 1D to avoid overlap of the measurement reflection pulses with the reference light pulses.) As shown in FIG. 1C, alluded to above, a Mach-Zehnder interferometer (MZI) includes an optical splitter to form two legs 125a and 125b which are made to be of different lengths by an additional length of optical fiber illustrated as coil 126, and a coupler 127 to recombine the optical signals in legs 125a and 125b. The Mach-Zehnder Interferometer 123 illustrated in FIGS. 1A and 1B is modified by inclusion of an acousto-optical modulator (AOM) 128 in leg 125b which is known in the art and capable of altering the wavelength of light passing through it while introducing a delay, use of a 2×2 coupler 127 to combine the signals in the respective legs 125a, 125b and output the combined signal on two paths, and inclusion of an optical circulator 130 and/or 131 in one or both respective legs of the MZI.

In the various embodiments of the invention that will be discussed below, it should be understood that a TEC and/or an acousto-optical modulator (AOM) may or may not be required and that provision of a reference reflector or interferometer is a perfecting feature of the invention, which is not necessary to successful practice of the invention in accordance with its basic principles but which engenders additional meritorious effects. In embodiments where an AOM is employed, only relative phase can be measured but relative phase favors detection and measurement of time-variant (e.g. cyclic or transient) parameters such as vibration and acoustic waves. In embodiments including an AOM, a TEC is an optional perfecting feature for stabilizing the laser light frequency or wavelength and a reference reflector or interferometer is a perfecting feature allowing compensation for slow system variation or drift. A chirped pulse can provide relative and absolute phase measurement; neither of which requires a TEC. However using a TEC along with a reference reflector or reference interferometer allows improvement of the accuracy of the relative or absolute phase measurement using a chirped pulse. It should also be appreciated that a chirp pulse is essentially and effectively a large plurality of pulses; each of a slightly different frequency. Therefore, using a TEC to provide chirped light pulses effectively provides the frequency shift otherwise provided by an AOM and allows detection and demodulation for determining a detection or measurement from a single chirped pulse and a single interference pattern rather than two or more pulses (e.g. of a pulse pair) and interference patterns at different discrete frequencies.

The basic principle of the interrogator 120 in accordance with the invention is to introduce a wavelength or frequency shift as part of the interrogation/demodulation process which causes interference between the reflections from adjacent Fabry-Perot interferometers while the different wavelengths or frequencies have a 90° phase difference due to the frequency shift, allowing known quadrature phase detection techniques to be applied to detect phase shift caused by application of a measurand (e.g. condition to be measured) to a portion of the measurement optical fiber. Application of a frequency shift as well as use of the original frequency to form a group of plural interference patterns as an incident of interrogation of the measurement optical fiber not only removes virtually all significant constraints on the interrogating light parameters but, in accordance with the invention, introduces an additional interference which with a new frequency and a 90° phase shift to the interference at the original frequency. The interference at the original frequency is not sufficient for demodulation but the group of two or pair of interferences, both of which appear as amplitude variation in a signal provide enough information for robust demodulation. That is, when two (or more) interferences at different frequencies are provided with a 90° phase shift between them, the pair of amplitude variations provides demodulation that is more readily, easily and rapidly detectable and has improved fidelity to a detected and measured incident vibration or acoustic wave. By the same token, a highly robust vibration measurement system can be formed from much less expensive and non-critical elements than was previously possible while avoiding the problems, drawbacks and limitations of known vibration measurement or detection techniques as alluded to above.

In operation (which will be described as occurring in two sequences depicted in FIGS. 1A and 2A, respectively), a light pulse is generated preferably from a pulsed laser 121 but could be produced from a continuous laser with the pulses being formed by an optical shutter or electro-optic modulator, EOM, (both of which techniques for providing pulsed interrogation light are collectively illustrated schematically at 121). It is generally preferred that the pulses be of short duration such that the physical length of a light pulse in the measurement optical fiber is less than the distance between PRs so that reflected pulses do not significantly overlap in the absence of a condition detectable by the sensing or measurement optical fiber. Lasers capable of nanosecond and femtosecond duration pulses are commercially available but could be extremely expensive. However, since the distance between partial reflectors can be made long without compromising the accuracy other than spatial resolution of the system in accordance with the invention, inexpensive distributed feedback (DFB) laser diodes can be used. In this regard, the loss of spatial resolution of an extremely long measurement optical fiber can be recovered by winding the measurement optical fiber between PRs on one or more mandrels such that the length of measurement optical fiber between PRs is much longer than the physical separation of PRs in the PR array. While such lengths of optical fiber limit repetition frequency of interrogation light pulses, the mandrels are also subject to vibration and acoustic waves of interest and serve to effectively amplify the vibration or acoustic wave signal. Similarly, while relatively high frequency repetition of the interrogation process is desirable, the repetition rate is limited by the "round-trip" transit time of an optical pulse from one end of the measurement optical fiber to the other and return since, preferably, only one injected interrogation light pulse is allowed to be present in the measurement optical fiber at any given time (although many reflections of the interrogation light pulse will be present). Since the length of measurement optical fiber for most applications is quite long (often approaching several kilometers or more), pulse repetition rate, generally in a range of 10 kHz-100 kHz as will be discussed below, is well within the capabilities of DFB laser diodes and sufficient for most applications.

The light pulse from laser source 121 is passed through optical splitter 122 and injected into the measurement optical fiber 110 through which it propagates to each of the partial reflectors PR1-PRn, each of which will reflect a small portion of the optical power incident thereon, as indicated by the curved arrow at each of the PRs, and returned to optical coupler/splitter 122 from which it is tapped off toward the MZI 123. Since the propagation speed of the light pulse is a function of the refractive index of the fiber and finite, the reflections from the respective PRs reaching the MZI will appear as a pulse train as shown at waveform A of FIG. 1A. This pulse train is then split at coupler/splitter 124 into two identical pulse trains which are propagated into the respective legs 125a, 125b of MZI 123. In leg 125a, a preferably adjustable delay is applied to the pulse train as schematically illustrated by optical fiber coil 126. In leg 125b the acousto-optical modulator is selectively operated to shift the frequency (either upwardly or downwardly) or wavelength of each of the pulses in pulse train A which inherently causes a delay, $\tau$, as shown in pulse train B of FIG. 1A. It should be understood that the delay applied in leg 125a as shown in FIG. 1A is (or is adjusted to be) less than the delay applied by AOM 128 and, in fact, may be very slight so that the pulses in the two legs do not significantly overlap in time. It should also be understood that the delay applied in leg 125a is not necessarily visible in pulse train C of FIG. 1A which thus serves to more clearly illustrate the correspondence of pulses in the two MZI legs to pulse train A and pulse trains B and C, which should be understood as being slightly shifted to the right relative to pulse train A in order to include that delay as illustrated with exaggerated delays in FIG. 1AA.

More specifically, for an even spacing of PRs, the reflected pulses arrive at intervals of $2\tau$ as determined by the spacing of the PRs. The AOM will delay the pulse train by $T_1$ and the fiber coil delays the pulse train by $T_2$. In FIGS. 1A and 1AA, $T_2$ is less than $T_1$ and have the relation $$T_1 - T_2 = \tau$$

and the pulses with different frequencies are interleaved when combined at coupler 127. The actual value of the time delay by the AOM and the fiber coil are not important and can be large or small but there must be some difference between the time delays to achieve the interleaving.

Then, after passing through optical circulators 130, 131, pulse trains B and C are again combined at coupler/splitter 127 to form pulse train D with pulses grouped into pairs to further show the correspondence to the pulses of pulse train A. Thus each pulse of reflected optical power from each of the PRs will result in a pair of pulses with one pulse at the interrogation light pulse frequency or wavelength and one pulse at a shifted frequency or wavelength.

Figure 2A:
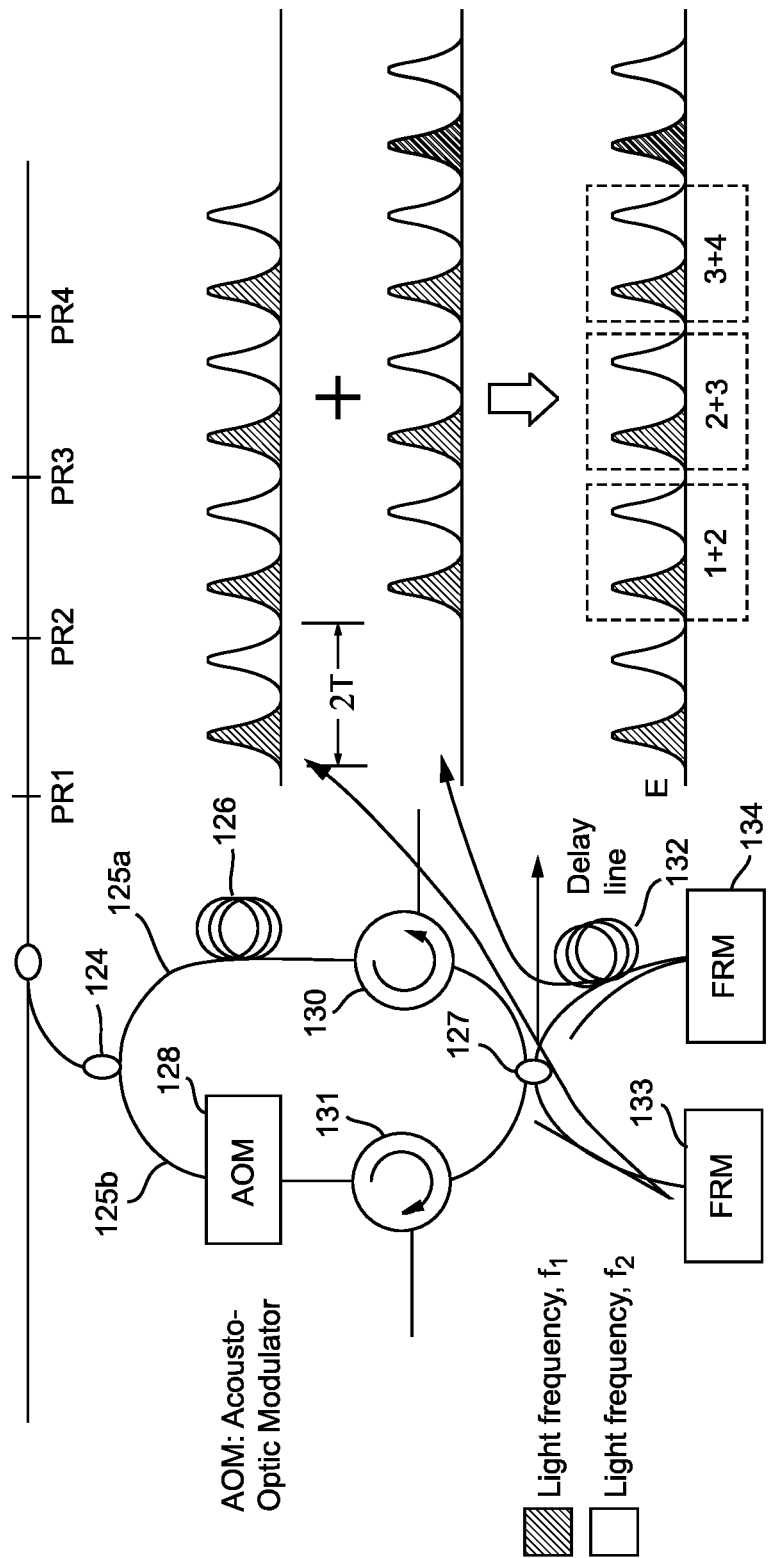

Referring now to FIG. 2A, coupler/splitter 127 not only combines pulse trains B and C to result in pulse train D but splits pulse train D to propagate in two separate paths to Faraday rotator mirrors (FRMs) 133 and 134 which serve to avoid polarization fading effects in the two paths as the reflected signals are propagated back to the MZI 123 through coupler/splitter 127 (but can be replaced by ordinary reflectors if such effects are not significant). The delay, T, (which must equal T in the special case illustrated in FIG. 1AA) imposed by a single propagation of pulses through delay line 132 is somewhat critical since the function, achieved by a delay of 2T (achieved by passing through passing through delay line 132 twice) is to superimpose (e.g. align in time) the pulse pair of rectangle 1 on the pulse pair of rectangle 2, the pulse pair of rectangle 2 on the pulse pair of rectangle 3, the pulse pair of rectangle 3 on the pulse pair of rectangle 4 and so on in FIG. 1A as shown in FIG. 2A; resulting in the pulse pairs 1+2, 2+3, 3=4, etc. in the dashed rectangles of FIG. 2A when again combined at coupler/splitter 127 from which they propagate to the circulators 130 and/or 131 and output to photodetector(s) (PD).

Figure 2B:
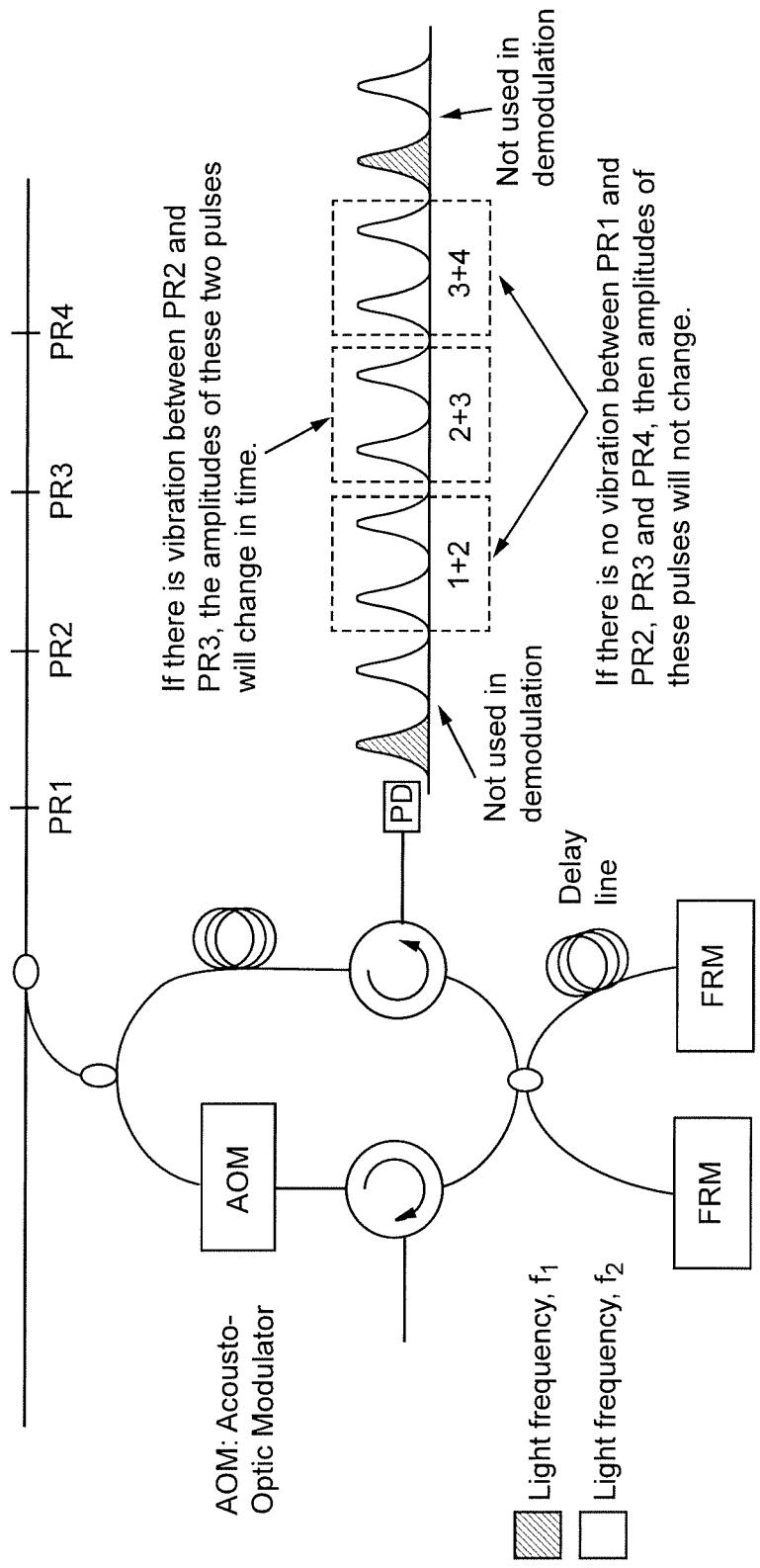

The operation of the invention as described above thus provides a function as summarized in FIG. 2B. Specifically, if no vibration affects any of the PRs in the measurement optical fiber, the amplitude of pulse pairs 1+2, 2+3, 3+4, etc. will not change over time if the reflection strengths of the PRs are equal or in a particular proportion if the reflection strengths of the PRs are unequal. However, if any of the PRs (or, more accurately, PRs and/or the measurement optical fiber segment length(s) between any pair(s) of PRs) are affected by vibration or an acoustic wave, change in timing of the reflected pulse from the affected PR and/or measurement optical fiber segment and a phase shift will occur in the reflections from at least one PR pair relative to other PR pairs for adjacent segments of the measurement optical fiber and a change in interference pattern will be caused due to that phase difference. The change in interference patterns of reflections from adjacent segments will alter pulse signal (sometime referred to as an "interference fringe" or, simply, "fringe") amplitude when time-sequential pairs of pulses are aligned in time and superimposed. Therefore, any vibration or acoustic pressure wave will cause a change in amplitude of the photodetector PD output over time that represents the behavior of the vibration or acoustic pressure wave with good fidelity limited only by the interrogation light pulse repetition rate which, in turn, is limited by measurement cable length that may be freely designed in view of the particular application of the invention.

While the length of the measurement optical fiber imposes a limitation on interrogation pulse repetition rate, as alluded to above, that limitation is relatively minor and of little practical importance for most applications, as will now be discussed. Specifically, it should be appreciated that most single mode fibers have an index of refraction of about 1.46 with the effective index of refraction for multi-mode fibers being somewhat higher. Therefore, for simplicity in this discussion, the effective index of refraction can be estimated as being 1.5 and thus the speed of light in the measurement optical fiber can be estimated to be $2 \times 10^8$ meters/second. Thus, if only one injected interrogation light pulse is allowed to exist in the measurement optical fiber at any time, the maximum repetition rate for the interrogation pulse would be 100 kHz for a one kilometer long measurement optical fiber and 10 kHz for a ten kilometer measurement optical fiber. Thus, according to the Nyquist theorem the maximum bandwidth for an interrogator for a one kilometer measurement optical fiber would be 50 kHz which will provide substantial fidelity to the vibration or acoustic wave waveform, and, for a ten kilometer measurement optical fiber would be 5 kHz which may still be sufficient for many applications.

However, some of the bandwidth loss due to the measurement optical fiber length limitation on interrogation pulse repetition rate can be recovered by allowing two or more interrogation pulses to exist in the fiber at a given time although a substantial increase in modulation complexity would be incurred since the interrogation pulses would need to be multiplexed and the reflections de-multiplexed before demodulation. Time division multiplexing is clearly not practical if even possible since overlapping of pulses may compromise spatial resolution along the measurement optical fiber as well as increase the difficulty of distinguishing between pulses even if coded or tagged by amplitude or pulse length.

However, wavelength division multiplexing is a possible and well-understood technique and pulses can be separated by simple optical filters although some limitations of PR structures and difficulty in calibration of the system may be incurred and may not provide sufficient increase in fidelity to justify the increased complexity. Another parameter that could be used for including multiplexing as a perfecting feature of the invention to provide some increase in fidelity in the output is polarization although the additional expense of polarization maintaining (PM) cable of sufficiently great length may be impractical.

An alternative to multiplexing in applications requiring a particularly long measurement optical fiber that is likely to be more practical would be to divide the long measurement optical fiber into segments having lengths determined in accordance with required bandwidth and to couple interrogation light pulses thereto and receive reflection from each segment over a separate optical fiber leader associated with separate interrogators 120, as alluded to above, so that higher interrogation pulse repetition rates could be employed and the plural measurement optical fiber segments interrogated in a parallel and possibly interleaved manner such that an interrogation pulse could be launched into one segment independently of the presence of another interrogation pulse in another segment or leader. Independently interrogating shorter independent segments of a measurement optical fiber is also less likely to compromise spatial resolution of the system and may simplify and/or enhance spatial resolution. In other words, it is currently considered that simply multiplying the number of interrogators to interrogate the number of measurement optical fiber segments required to maintain required bandwidth is far more likely to be practical than using more than one pulse at a time through some multiplexing arrangement.

A measurement optical fiber that includes an array of serial PRs may be interrogated by numerous different methods and apparatus arrangements and numerous perfecting features of the invention can be included that can provide enhancement of various aspects of performance but which are not necessary to the successful practice of the invention in accordance with its most basic principles. Preferred examples of such methods and apparati and perfecting features that will enable those skilled in the art to apply the invention to virtually any circumstance or physical environment will now be discussed; from which many other suitable methods and apparatus arrangements will be apparent to those skilled in the art. In general, these methods and apparatus arrangements fall into one of two categories or types which are differentiated by the ways a frequency shift is introduced into the interrogation process or apparatus: a wavelength chirp based distributed interferometer interrogation and a wavelength shift distributed interferometer process.

As the name indicates, a wavelength chirp distributed interferometer interrogation technique interrogates the distributed Fabry-Perot interferometers (FPIs) by utilizing a light pulse that has a time dependent change in wavelength within the duration of the light pulse which may vary linearly or non-linearly with time, referred to as a wavelength chirp. The chirped light pulse may be developed in a number of ways such as direct current modulation of a laser diode which may include but is not limited to a distributed feedback (DFB) laser diode, an edge-emitting Fabry-Perot laser diode, a vertical cavity surface-emitting laser (VCSEL). The wavelength chirp may also be produced by an optical modulator external to the laser light source such as (but not limited to) an acousto-optic modulator (EOM), and electro-optic modulator (EOM), electro-absorption modulator (EAM), a semiconductor optical amplifier (SOA), and optical phase modulator (OPM) or any other device that can cause light wavelength to vary with time.

Several exemplary designs for wavelength chirp based interrogation of serial PR distributed FPIs will now be discussed, from which numerous variant and alternative techniques and apparati will be apparent to those skilled in the art. In these examples a DFB laser with direct current modulation will be used to explain system operation although other light sources and methods of wavelength chirp generation, such as the exemplary devices noted above may be substituted. A MI will be used in the following examples but a MZI or any other known or foreseeable type of interferometer may be used.

It is well known that direct current modulation of a laser diode changes the charge current density in the laser cavity which, in turn, varies the index of refraction of the materials in the laser cavity. Therefore, the effective optical length of the laser cavity varies with the direct current through the laser cavity that causes change in charge density.

Figure 3A:
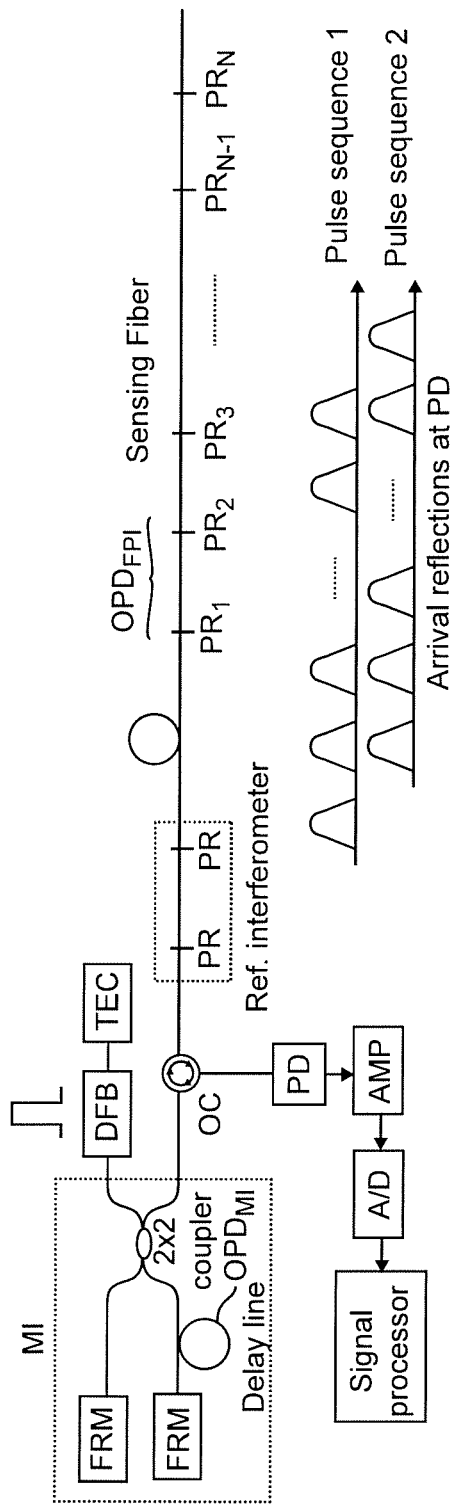
FIGS. 3A and 3B illustrate two closely related embodiments of the invention using a chirped light pulse, FIG. 4 graphically illustrates the optical response of the embodiments of FIG. 3A or 3B.
Figure 3B:
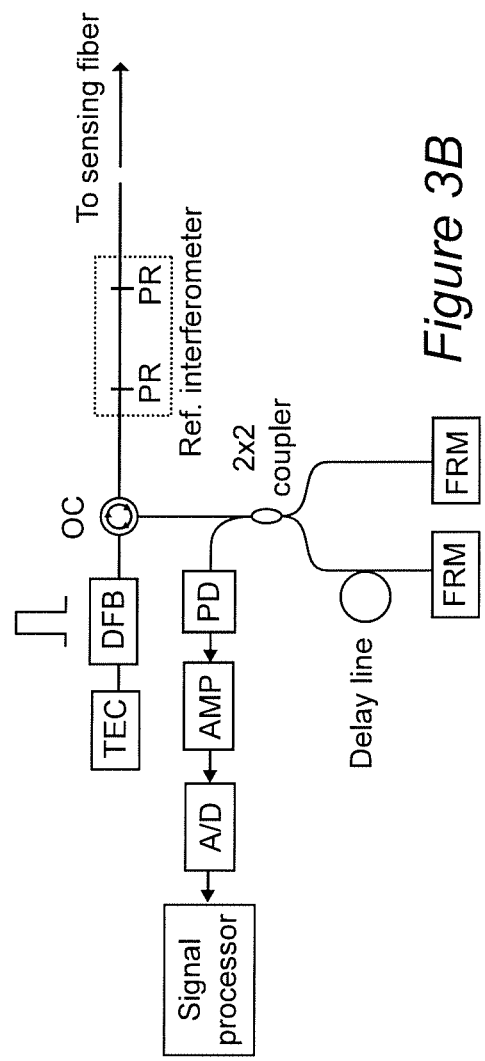

Another device that is important to a chirped wavelength serially distributed FPI interrogation system is an optical interferometer having an imbalance in (physical) optical path length between the two arms of the interferometer. The interferometer type may be (but is not limited to) the well-known Michaelson (MI) or Mach-Zehnder (MZI) type and may be constructed with optical fibers, optical fiber based components and/or other types of optical devices and components. For example, a fiber-based MI may comprise a 2×2 fiber coupler two optical fibers and two Faraday rotation mirrors (FRMs) as shown in FIGS. 3A or 3B. (The FRMs rotate light polarization by 90° to cancel the Fiber birefringence effects.) An optical delay line may be used in one arm of a fiber-based MI or MZI to create an optical path imbalance between the two arms which is referred to as an optical path difference (OPD). When the two arms of a MI use the same type of optical fiber in both arms, the OPD is the product of the refractive index and twice the differential optical path length (since the light traverses each respective fiber arm twice). In a MZI where the light traverses the respective fiber arm only once, the OPD is simply the product of the refractive index and the differential optical path length.

One or both arms of an MI or MZI may be built with fibers that may or may not be of the same materials or optical characteristics or both. These characteristics may include (but are not limited to) fiber structure, materials, core diameter, index of refraction, mode field diameter, chromatic dispersion coefficient and/or optical wavelength dependence which may be the same as or different from the optical sensing or measurement fiber. If the sensing or measurement fiber is a normal silica telecommunications grade single mode fiber, some exemplary types of optical fibers that may be used in one or both arms of an interferometer may include (but are not limited to) large effective area fibers (LEAF), photonic crystal fibers (PCF) random hole fibers, dispersion compensation fibers (DCF) high-birefringence (Hi-Bi) fibers and spun fibers.

FIG. 3A shows a sensor system where the MI is placed on the light source end. The wavelength chirped laser pulse generated by direct modulation of the DFB laser first enters into the MI. Due to the MI optical path imbalance, one input laser pulse is converted into two laser pulses (e.g. a pair of pulses) which are identically chirped. After a 3-port fiber circulator, which may also be replaced by 2×2 coupler, the two pulses of a chirped pulse pair are then launched into the sensing optical fiber that comprises serial PR pairs, which may or may not be evenly distributed. An even PR distribution is shown for simplicity. The reflections from the serial PRs are detected by a photodetector (PD). The reflected light pulses induced by Pulses 1 and 2 form two pulse sequences as shown as they are reflected from each of the serially distributed PRs. The PD output may be amplified by an electronic amplifier and digitized by an analog to digital convertor (ADC) for further signal processing.

Figure 4:
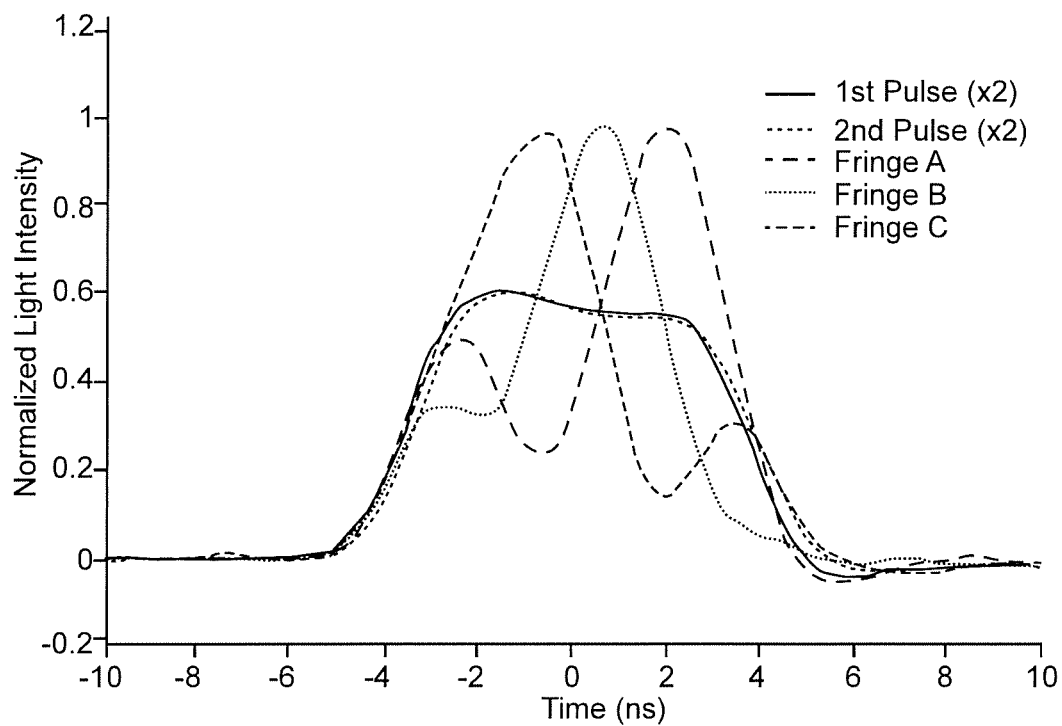

The OPD between reflections from two neighboring PRs is referred as $OPD_{FPI}$ and may be designed to be the same as the $OPD_{MI}$ (OPD of the MI) or slightly different. Since these two OPDs are equal or approximately equal to each other, the two pulse sequences reflected from the serial PRs are aligned or approximately aligned with a temporal displacement that is approximately equal to the differential time delay between the two reflected neighboring pulses such that a reflection of pulse 1 is aligned with or substantially overlaps with a reflection of pulse 2 and vice-versa from adjacent PRs. Thus each of these pulses in one pulse sequence coincides or significantly overlaps with another one in the other sequence except for the first pulse in Sequence 1 and the last one in Sequence 2. These overlapped pulses interfere with each other. The laser frequency chirp plus the difference in the two OPDs or the difference in the chromatic dispersions (the phenomenon of light speed in a medium being dependent on frequency/wavelength) of the two OPDs or both therefore produces temporal interference fringes within the overlapped region between the two pulses as illustrated in FIG. 4. (The intensities of the first and second reflected pulses are each illustrated as enlarged by a factor of two. Since the DC component of the interference pulse is twice the intensity of the a single pulse, given that the pulses have equal intensity, the visibility of the fringes is easily seen. It should also be appreciated that while the first and second pulses appear substantially the same, in FIG. 4 there is, in fact, approximately a temporal spacing of about 0.1 Nanoseconds between them. The laser frequency chirp range and difference in $OPD_{FPI}$ and $OPD_{MI}$ values or in the chromatic dispersions of the these two OPDs may be designed to produce at least one quarter of one interference fringe. (the OPD difference should be varied by more than $\pi/2$ to obtain at least one quarter of one interference fringe.) Preferably more than one fringe will result within the chirped optical frequency range of the chirped laser pulse. The peaks and valleys in the fringes as shown in FIG. 4 correspond to optical phases of $N2\pi$ and $M2\pi+\pi$ (N and M are integers), or constructive and destructive interferences, respectively. The fringe contrast is related to the amplitudes and degree of coherence of the two pulses at the time where the two pulses interfere with each other.

In the signal detection of the system shown in FIG. 3A, one, two, three or more points of the fringes may be sampled by the ADC to determine the OPD between the two interfering pulses at the PD or its variations. This OPD is referred to as $OPD_{PD}$ and is given by the difference between $OPD_{FPI}$ and $OPD_{MI}$ which will change under the influence of vibration or acoustic energy or other stress or temperature variation. These OPDs could be designed so that $OPD_{PD}$ does not equal zero and fringes can be observed due to the existence of the chirp such that when $OPD_{PD}$ changes due to changes in conditions in the environment of the measurement optical fiber causing changes in the fringes, the corresponding signal can be calculated from the change in the fringes. Even if $OPD_{FPI}=OPD_{MI}$ and $OPD_{PD}$ is zero and no change in the fringes can be observed, a change in conditions in the environment of the measurement optical fiber will cause inequality of $OPD_{FPI}$ and $OPD_{MI}$, fringes will appear and demodulation can still be performed.

It is also clear that the absolute value or variation of $OPD_{PD}$ may be measured by the measurement of $OPD_{PD}$ when the MI is placed in a stable environment where the vibration or temperature or both are controlled. For absolute measurement of $OPD_{PD}$, more than two points of the interference fringes need to be measured while relative measurement of $PD_{PD}$ may require a single digit number of or as low as one but preferably two, three or more points of interference fringes may be measured. Various methods which may include but are not limited to white light interferometry signal processing algorithms for absolute $OPD_{PD}$ measurement such as that described in "Signal processing of white-light interferometric low-finesse fiber-optic Fabry-Perot sensors," by C. Ma and A. Wang, Appl. Opt., 52, pp127-138(2013) which is hereby fully incorporated by reference. For applications where only relative measurement is of interest, some other methods such as the quadrature phase demodulation as described in "Determination and correction of quadrature fringe measurement errors in interferometers," by P. L. M. Heydemann, Applied Optics, 20(19), 3382, (1981) which is also fully incorporated by reference, or the utilization of three signals with 120 degrees phase separation from each other as described in "Passive stabilization scheme for fiber interferometers using (3×3) fiber directional couplers," by K. P. Koo, et al., Appl. Phys. Lett. 41(7), 616, (1982), which is hereby fully incorporated by reference, may be applied.

The reflected pulse shape and fringe visibility is necessary for signal demodulation and the maximum and minimum values of the fringe are required for normalization in the process of the signal demodulation. In addition to the laser wavelength chirp via the direct current modulation, as an optional perfecting feature of the invention, the laser center wavelength may also be tuned via a built-in thermoelectric control (TEC) either for information about the maximum and minimum of the interference pattern/fringe for each predetermined signal sampling point or directly for $OPD_{FPI}$ measurement. That is, the maximum and minimum value of the fringe or interference pattern at each sampling point is required in signal demodulation and the TEC used to develop chirp in the interrogation pulse can facilitate obtaining this information.

When any PR pair is subject to a disturbance that can change the $OPD_{FPI}$ of the PR pair, such as vibration or an acoustic wave, the relative optical phase between the two interfering pulses at the PD will change accordingly. The reflections from different PR pairs can be distinguished by their arrival times so distributed sensing of any quantity that can alter $OPD_{FPI}$ can be realized and the location of the disturbance.

In the system, one or multiple optical amplifiers may be used if needed to increase the system signal to noise ratio (SNR). These optical amplifiers may include but are not limited to erbium-doped fiber amplifiers (EDFAs) and semiconductor optical amplifiers (SOAs). Each optical amplifier may or may not be used in conjunction with a narrow bandpass optical filter centered to the laser wavelength or center of the chirp frequency range to suppress the amplified spontaneous emission (ASE) noise from the optical amplifier. This filter is referred to as an ASE filter. These optical amplifiers and the associated ASE filters may be placed at the laser injection end or at the light detection end of the sensing or measurement fiber or both. These optical amplifiers and ASE filters are optional and may or may not be shown in the illustration of other exemplary disclosed embodiments of the invention. Further, illustration of an EDFA should be understood as exemplary and representative of optical amplifiers of any and all types. In addition, ASE filters may include but are not limited to FBGs and multilayer dielectric thin-film filters.

Thus, the invention provides a technique that can be implemented with inexpensive apparatus which is extremely sensitive to changes in phase of reflections of an interrogation light pulse that causes rapid changes in the interference pattern (due to the use of different wavelengths or frequencies to cause large temporal changes in interference patterns when overlapped) as a signal amplitude which will have good bandwidth (as may be freely designed, as discussed above) and good fidelity to any incident vibration or acoustic wave. Moreover, the invention allows the vibration or acoustic wave to be not only detected but quantitatively measured and spatially located by reflection timing.

The MI as shown in FIG. 3A may also be placed at the signal detection end as will be explained in connection with FIG. 3B. The principle of operation of this system is essentially the same as the embodiment of FIG. 3A. As previously indicated, the MI in the systems in FIGS. 3A and 3B may be replaced with a Mach-Zehnder interferometer (MZI) as shown in FIG. 1C. The MZI may or may not be constructed with polarization maintaining (PM) fibers or PM fiber couplers. When non-PM fibers are used, polarization controllers may or may not be utilized in one or both arms of the MZI. Similar to the MI position in the system shown in FIG. 3A or 3B, the MZI may be placed at the light injection or detection end.

As another perfecting feature of the invention not required for operation in accordance with its basic principles, a reference interferometer (RI) may be utilized to generate information about the laser source frequency, the frequency or wavelength chirp and intensity in real-time for calibration of the laser. The RI may include but are not limited to a MZI, a MI and an FPI, and may be placed in an environment where vibration or temperature or both may be controlled. The RI may be inserted directly into the sensing or measurement fiber and the signals from the RI can be distinguished from the sensing FPIs by their arrival time as explained in connection with FIG. 3. Alternatively, the RI, such as an FPI, may be placed in a separate channel as shown in FIG. 5.

Figure 5:
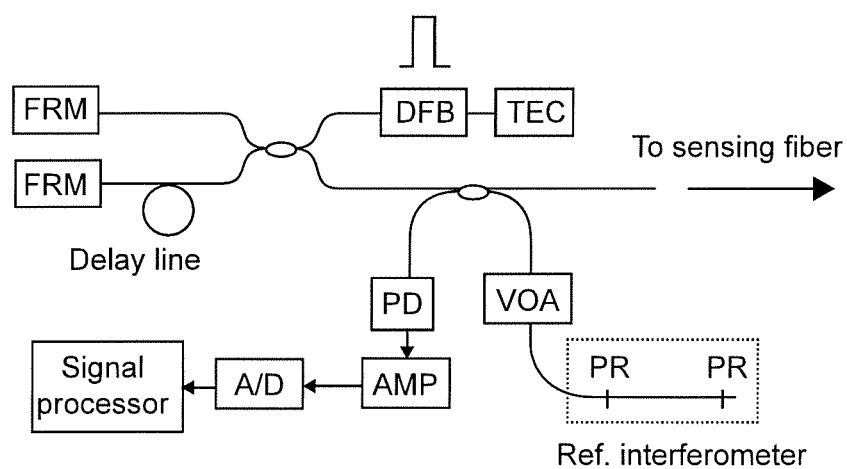
FIG. 5 illustrates the addition of a reference interferometer for making absolute measurements of parameters.

The use of an interferometer such as the MZI or the MI in the systems illustrated in FIGS. 3 and 5 may be eliminated when the serial PRs are paired and the distance between two neighboring PR pairs may be greater than the distance that separates the two PRs in the respective pairs. One example of such a system is explained in connection with FIG. 6.

Figure 6:
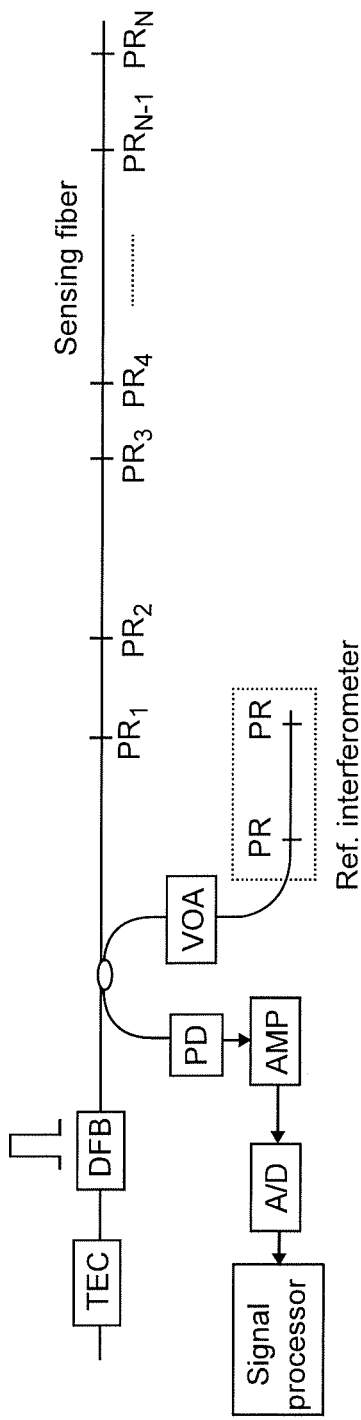
FIG. 6 illustrates a variant form of the invention in which the distance between a pair of partial reflectors is smaller than the distance between pairs of partial reflectors allowing the reflections from the partial reflectors of a pair to overlap in the time domain, allowing an interferometer to be eliminated.

In the arrangement shown in FIG. 6, a wavelength chirped light pulse generated via direct current modulation to the DFB laser is directly launched into the sensing or measurement fiber without generation of a second pulse from a single originally generated pulse. The spatial length of the pulse within the sensing or measurement fiber should be greater than the fiber length that separates the two PRs in a pair but may or may not be shorter than the distance between two neighboring PR pairs.

The reflections from the RI may therefore arrive at the PD earlier than the ones from the PR pairs in the sensing fiber so the signals can be distinguished by their arrival times. A variable optical attenuator (VOA) may also be utilized to control the magnitude of the signals returned from the RI to be the same or different from the ones from the sensing fiber to further identify reflection signals from the RI. It should be pointed out that the signals from the RI may also be detected by a separate PD that is different from the PD used for the detection of the reflections from the distributed FPIs in the sensing fiber. In this case, an additional fiber coupler and circulator may, for example, be utilized to separate the signals from the RI and the distributed FPIs into different PDs. The two pulses reflected from the two PRs in a pair are slightly displaced in time. Due to the pulse wavelength chirp, interference fringes may appear as in the detected signals in the previously described systems. The rest of the operation of this system may be identical with the previously described sensor systems.

For frequency shift based distributed interferometer interrogation, the sensing fiber also preferably comprises serial artificial partial reflectors, which form distributed FPIs that may be interrogated with other methods which will now be described. In the previously described distributed FPI interrogation techniques, the optical spectra detected are all the original spectral components from the optical source. Different interrogation techniques that utilize devices that shift the original frequencies or wavelengths to new ones in much the same manner as in the generalized description of the basic principles of the invention discussed above in connection with FIGS. 1A-2B will now be discussed in greater detail. Again, the basic concept is to generate different relative optical phases that correspond to the new frequencies. The relative optical phases from the source original frequencies and the additional relative optical phases by the new frequencies offer a set of signals that have desired phase differences such as quadrature phase shift as needed for the measurement of variations in the relative optical phase between any two optical reflections that are brought together for interference and detection.

Figure 7:
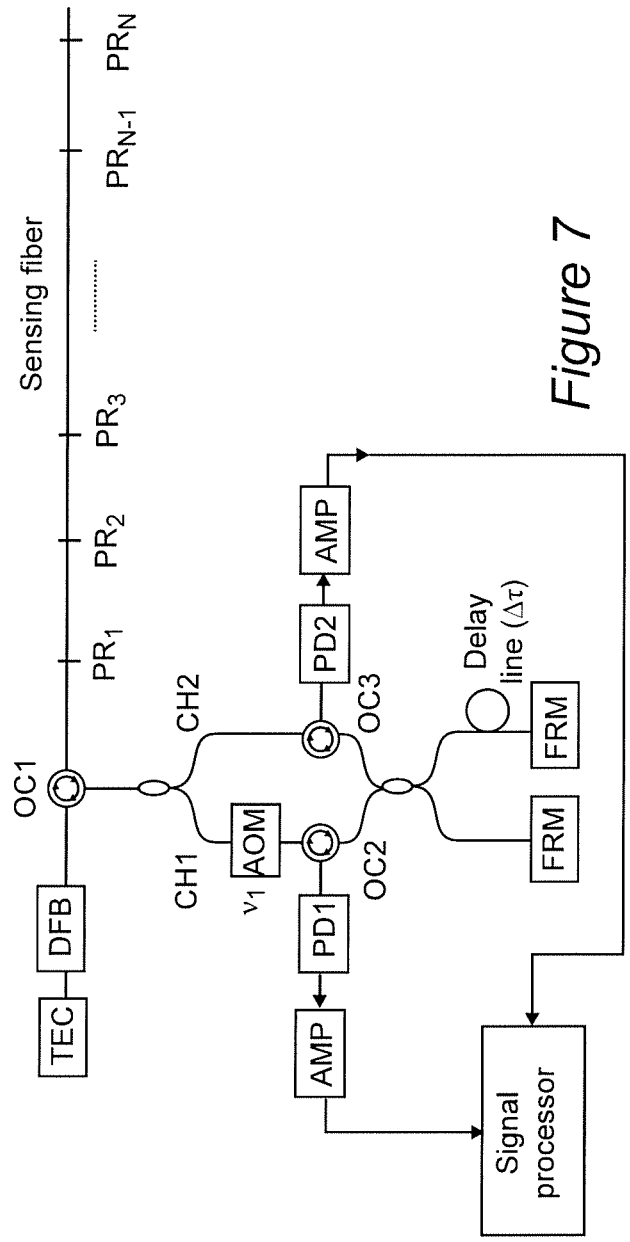
FIG. 7 illustrates a more complete embodiment of the invention than in FIG. 1A and 1AA.

One embodiment under this class of embodiments of the present invention is shown in FIG. 7. The light pulse injected into the sensing or measurement fiber may be from a coherent source, such as a laser, or from an incoherent source, such as a broadband optical source. The laser may be but is not limited to a DFB laser diode, a VCSEL, a Fabry-Perot laser diode, or a fiber laser. The incoherent source may include but is not limited to a light emitting diode (LED), a superluminescent diode (SLD), or an ASE source. Also, these light sources may be operated in a continuous wave (CW) mode or a pulsed mode. In the case of CW operation, an external modulator may be used to generate the light pulse. The modulation may be but is not limited to an EOM, an EAM, an AOM, or an SOA. The light pulse from the source may be amplified by an optical amplifier, which may be but is not limited to an erbium-doped fiber amplifier (EDFA), a semiconductor optical amplifier (SOA), a Raman optical amplifier (ROA) or a Brillouin optical amplifier (BOA). The optical amplifier may or may not be followed by an optical bandpass filter centered to the light wavelength to suppress the ASE noise.

After the first 3-port optical circulator (OC1), which may be replaced by 2×2 fiber coupler, the light pulse is then launched into the sensing or measurement optical fiber, which comprises spaced serial PRs as described above, forming FPIs. The input light pulse is reflected in part by each PR as the pulse propagates down the sensing fiber. The reflected pulses from the serial PRs along the sensing fiber are tapped off the input fiber by the OC1. These reflected pulses may or may not be amplified by one or more optical amplifiers, which may or may not be followed with ASE filters. The reflected pulses are then split into two channels by a 1×2 or 2×2 fiber coupler.

The serial pulses in the first channel go through an AOM that up or down shifts the optical frequency by $v_1$. The optical frequency of the pulses now becomes $f_1=f_0+v_1$. The AOM may be replaced with an electro-optic modulator or any other device that can shift the optical frequency of the input light. The pulses in the second channel simply travel in an optical fiber without frequency shift. The two groups of serial pulses in the two channels experience a differential time delays of Δt before they reach a 2×2 fiber coupler, which is part of a Michelson interferometer (MI), which is the same as the one in the systems shown in FIGS. 3 and 5. Δτ may be smaller or larger than the temporal separation T between neighboring pulses from the sensing fiber, and may or may not be equal to MT+T/2 where M is an integer.

The MI OPD may or may not be equal to the OPD of each fiber FPI formed by each PR pair. Also, the MI may be replaced with a MZI. The pulses out of the MI are directed to two photodetectors (PD1 and PD2) by the two optical circulators (OC2 and OC3), which may be replaced with 2×2 fiber couplers. OC2 and OC3 may or may not have equal distance to the 2×2 fiber coupler in the MI.

The optical pulses from Channels 1 and 2 (CH1, CH2) have a differential frequency of $v_1$ due to the AOM. Therefore, the same MI OPD results in different optical phases for the two groups of the optical pulses from Channels 1 and 2, respectively. The phase difference may be expressed as $\Delta\Phi=2\times OPD\times v_1/c$ where c is the velocity of light in vacuum. Here, $v_1$ may be designed to satisfy $$\Delta\Phi=N\pi\pm\pi/2 \quad (1)$$

where N is an integer. It should be pointed out that $\Delta\Phi$ may also take other values that are not equal to $N\pi\pm\pi/2$. When the condition of Equation (1) is met, the optical signals from the MI that are produced by the lights from the two channels are in quadrature. In the meantime, the two outputs from the OC1 and the OC2 that correspond to the light from either of the two channels are out of phase (phase difference=π). As a result, the light from the two respective channels results in two signals that are out of phase with each other and the signals yielded by the lights from the two channels are quadrature signals.

Figure 8A:
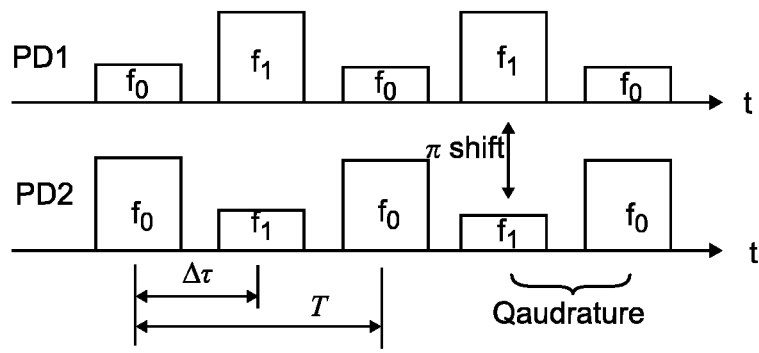
FIG. 8 illustrates two exemplary alignments of reflected light pulses.
Figure 8B:
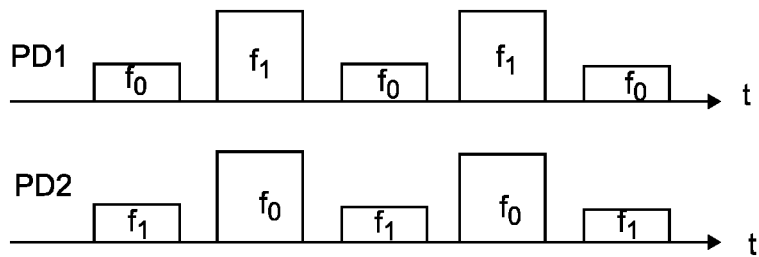

The signals from each of the two photodetectors (PD1 and PD2) are illustrated in FIG. 8. The interference signals between reflections from two neighboring PRs alternate in time by their frequencies $f_0$ and $f_1$. The outputs from the two PDs may be aligned in time in various ways, such as the two examples shown in FIGS. 8A and 8B. One way illustrated in FIG. 8A is that the signals out of the two PDs at $f_0$ or $f_1$ that result from the reflections of the same two adjacent PRs arrive at the two PDs at the same time. As stated previously, the two corresponding signals at $f_0$ or $f_1$ are out of phase. Another way is to align a signal at $f_0$ from one detector with another signal at $f_1$ from the other detector as shown in FIG. 8B. Again, this pair of signals is produced by the interference of the two reflections of two PRs adjacent to each other. These different signal alignments are realized by the control of the differential time delay between Channels 1 and 2, and the differential time delay from the MI 2×2 fiber coupler to the two photodetectors. Further, as previously stated, the differential time delay, τ, may be smaller or larger than the temporal separation T between two neighboring pulses from the sensing fiber (although T and τ should be approximately equal, as noted above), and may or may not be equal to MT+T/2 where M is an integer.

Electronic signals out of the photodetectors may be amplified by the electronic amplifiers (AMPs). Based on these signals, variations in the relative optical phase between the reflections from each PR pair can be determined. The phase computation may be realized by analog electronic circuits or by a digital computer after the signals are digitized with the ADC.

It should be understood that either OC2 or OC3 and the PD connected to it may be eliminated. In this case, the remaining PD can still output quadrature signals. Each pair of quadrature signals may enable the determination of the relative optical phase of the PR pair that produces the quadrature signal pair. In this case, some measures for signal calibration may or may not be needed.

Figure 9:
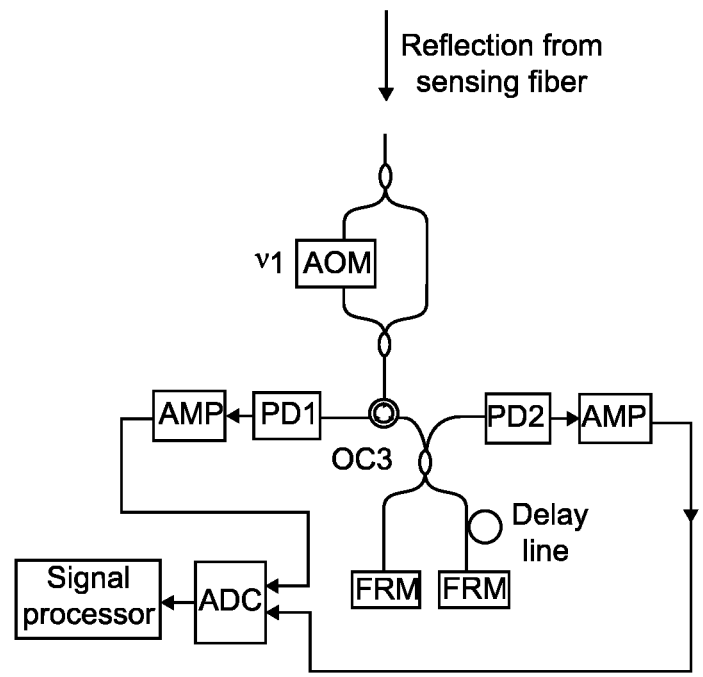
FIG. 9 illustrates a variant embodiment of the invention as discussed above in connection with FIG. 1A employing frequency or wavelength shift of reflected light pulse but combining the frequencies differently to require only one optical circulator.
Figure 10A:
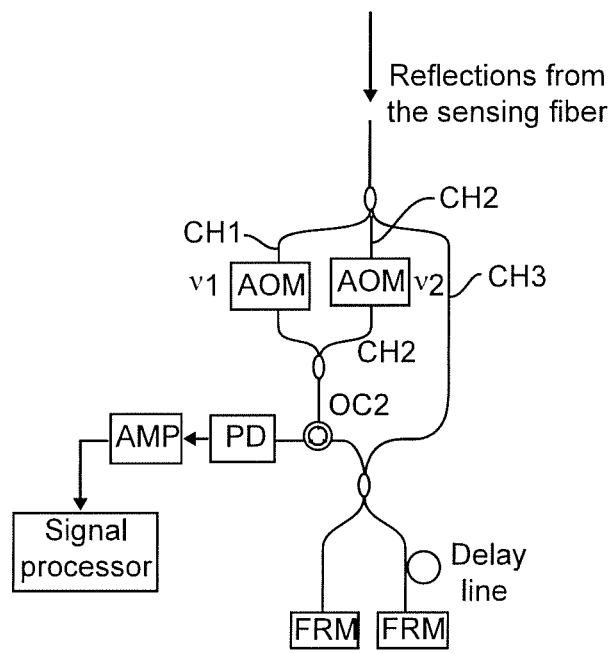
FIGS. 10A, 10B and 10C illustrate an embodiment of the invention employing two different frequency or wavelength shifts of reflected light pulses and the resulting photodetector output, respectively.
Figure 10B:
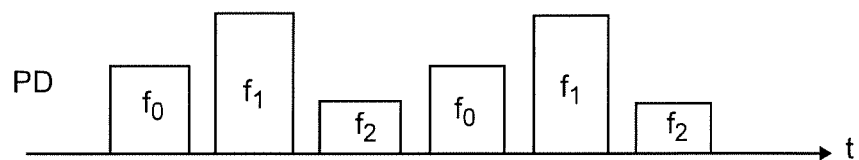
Figure 10C:
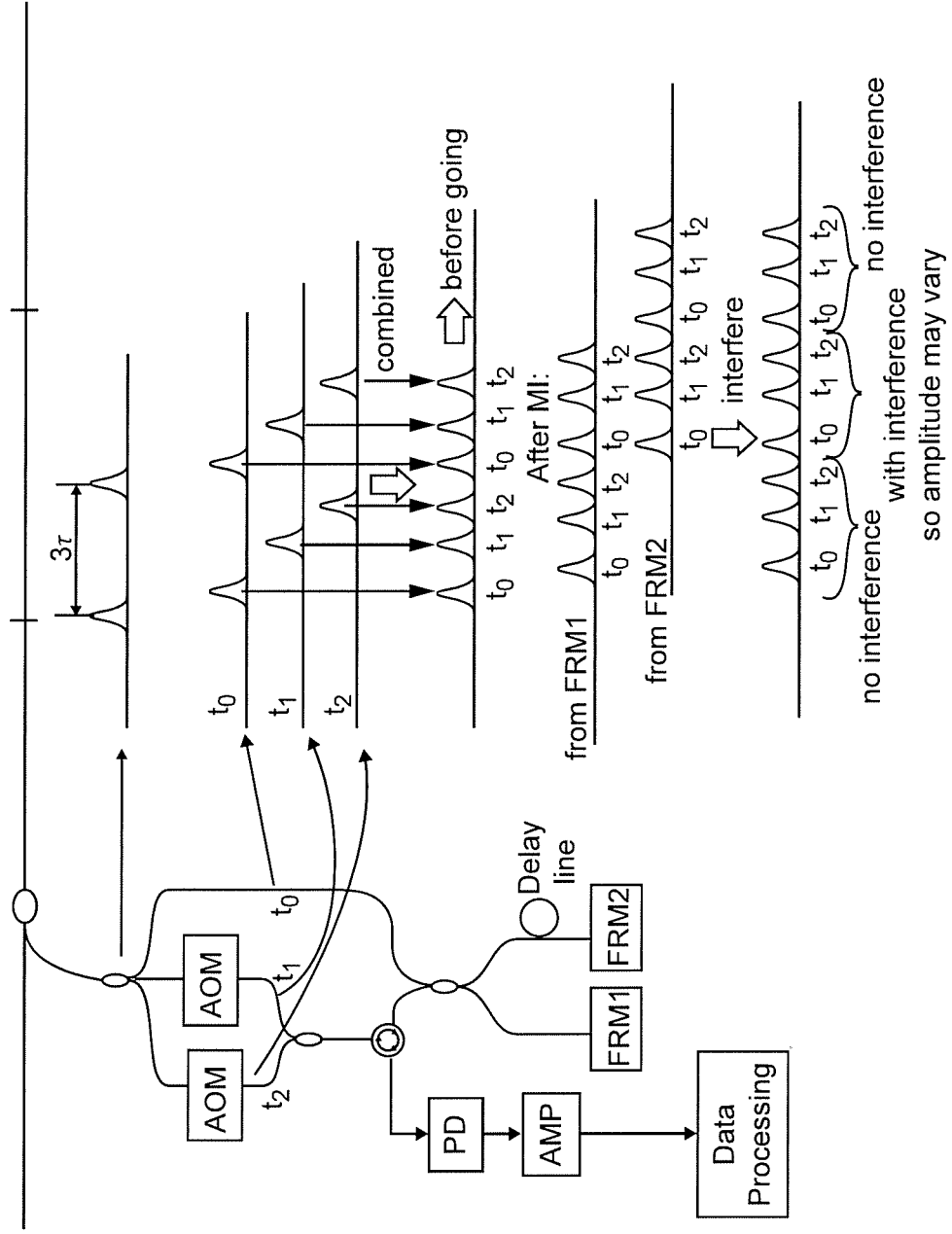

The relative optical phase between two adjacent PRs may be demodulated with other optical circuits that use the same or similar concept of the system in FIG. 7. One example is given in FIG. 9 in which the phase detection process is simply a repeat of the phase demodulation described above for the FIG. 6 system. The second example is depicted in FIG. 10A-10C in which the pulses from the sensing fiber are split into three channels instead of two. Channels 1 and 2 have AOMs with differing frequency shifts (and phase shifts/delays) while the third channel is simply a segment of optical fiber. The AOMs in Channels 1 and 2 shift the optical frequency of the input light by $v_1$ and $v_2$ so the pulses out of the two AOMs have frequencies of $f_1=f_0+v_1$ and $f_2=f_0+v_2$. The pulses at $f_0$, $f_1$ and $f_2$ enter into the MI through channels CH1-CH3 as shown in FIG. 10A. Generally, the interference between the reflections from two neighboring PRs generates three interference signals that correspond to $f_0$, $f_1$ and $f_2$. The two frequencies $f_1$ and $f_2$ may or may not be designed to make the optical phases of the three signals $3\pi/2$ apart from each other. In addition, these signals may be distinguished in time as explained in FIG. 10B. The time sequence of these signals can be controlled by differential time delays $\Delta\tau 1$ and $\Delta\tau 2$ of the lights in Channels CH1 and CH2 relative to Channel CH3. FIG. 10C is essentially the counterpart of FIG. 1AA but includes reflected pulses at three frequencies instead of two and explains the relationship of FIGS. 10A and 10B and a delay line in the MI sufficient to superimpose like frequencies (e.g. $f_0$, $f_1$ and $f_2$, respectively) to cause three interference patterns.

As alluded to above, while PRs are not necessarily required for practice of the invention, they are very much preferred. Suitable PRs can be formed by numerous structures and different techniques which will now be discussed in connection with FIGS. 11A-11E.

Figure 11A:
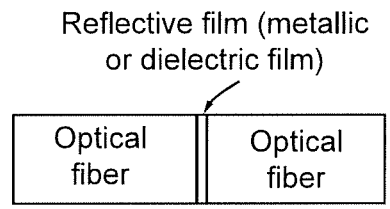
FIGS. 11A, 11B, 11C, 11D and 11E illustrate various exemplary structures that can be employed as partial reflectors of a sensing or measurement optical fiber cable.

A reflective thin film between two fibers is suitable to form a PR as illustrated in FIG. 11A. The film may be a single layer of dielectric or metallic material or may be a stack of multi-layers of dielectric materials with different refractive indices. The film may be fabricated directly on the end of a fiber by various methods such as thermal evaporation, sputtering and self-assembly of monolayers.

Figure 11B:
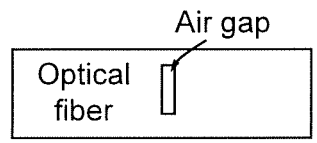
Figure 11C:
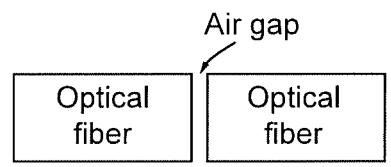

A small hollow gap in a fiber is also suitable for use as a PR as illustrated in FIG. 11B as is a joint between two fibers as illustrated in FIG. 11C. The gap is generally smaller or much smaller than the wavelength of the laser to be calibrated. The hollow gap may be filled with air, other gas or gases, a liquid or a solid. The filling material must be transparent to the laser wavelengths and must have a refractive index different than that of the fiber so Fresnel reflections can take place at the interfaces between the fiber(s) and the material. It should be noted that the gap in a fiber may be formed by micromachining of a fiber from the side of the fiber or by splicing two fibers together. The side micromachining can be realized by different techniques such as the use of a high power pulse laser (e.g. a femtosecond laser) or a focused ion beam (FIB). If the gap is created by thermal fusion splicing two fibers, one or both of the two fibers may need to be altered on their ends before the splice. One way to alter a fiber end is, but not limited to, the application of an acid, such as hydrofluoric acid, to etch the core and the cladding of the fiber to different depths. This differential etching is enabled by the dopants in the core or in the cladding or in both. These dopants are essential to the formation of the fiber waveguide structure. One of the most common dopants is germanium in the core of a silica fiber to raise the refractive index of the core to be slightly greater than that of the silica cladding. Because of the dopant(s), the etching rate of the fiber core can be controlled to be faster or slower than that of the fiber cladding by a suitable buffered acid solution. All of these techniques are familiar to those skilled in the art. When a fiber that is etched more in its core is spliced to another fiber which may be un-etched or etched via thermal fusion, a fiber with a small air void (a thin layer of air or another gas between the two fiber cores) is created in the fiber. This thin layer of air void can function as a PR.

A permanent or demountable fiber to fiber connection is also suitable for providing a PR. It is known that when two fibers are thermal fusion spliced, a small back reflection can take place at the splice point. The reflectance can be varied by the control of the splice conditions. For example, the reflectance can be controlled by the electric current that generates electric arcs on a commercial fiber fusion slicer. Also, a PR can be formed by a demountable fiber connector. The fiber connector may be between the same type or different types of two fibers. Different types of fibers may have different refractive indices or different refractive index distribution in a fiber cross-section. Also, the fiber ends may have the same or different geometric fiber end shapes.

Figure 11D:
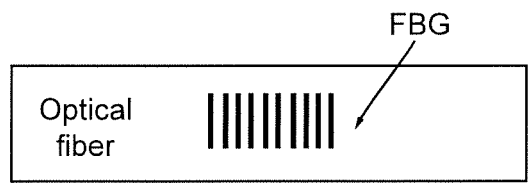

Another structure suitable for use as PRs are fiber Bragg cells formed by inscribing shallow and closely spaced grooves on the exterior os the measurement optical fiber core, illustrated in FIG. 11D, to form serial FBGs in the sensing fiber. These grooves interact with certain wavelengths of incident light to reflect a small fraction of the light at certain wavelengths or wavelength ranges. An FBG may be inscribed in a fiber by a laser at a certain wavelength, which may be in ultra-violet, visible or infrared range. These FBGs may be narrow or broadband FBGs, and each FBG serves as a PR. Broadband FBGs may be desired for applications where the FBGs may be subject to substantial axial strains, which will shift the FBG reflection spectrum. The reflections of these FBGs should be sufficient to ensure that the laser wavelength remains in the FBG reflection spectrum even under the maximum strains that the FBGs may experience.

Broadband FBGs can be achieved by different methods. The first exemplary is to make short FBGs that have a relatively small number of grating periods in each grating. The second exemplary method is to vary the FBG grating period (e.g. the spacing between grooves) in an FBG to broaden the FBG reflection spectrum. This type of FBGs is also called chirped FBGs. The grating period chirp may be linear or nonlinear. Other techniques of forming FBGs are known or foreseeable and all should be suitable for practice of the invention if the desired reflection spectrum can be accurately obtained for a given design or application.

These FBGs may be fabricated through fiber photosensitivity on a fiber draw tower during the fiber fabrication. They may also be inscribed in a fiber after the fiber fabrication or in commercial optical fibers. The grating inscription may be done with or without the fiber coating removal and with or without hydrogen loading. Intrinsically photosensitive fibers may also be used for the fabrication of the FBG array.

Figure 11E:
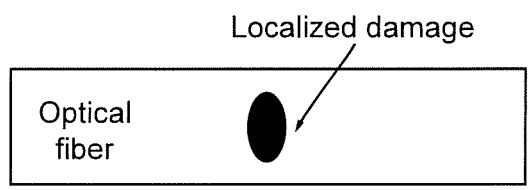

Another exemplary method for the creation of a PR is a localized or a 'point' refractive index discontinuity in the core or cladding or both of a fiber as illustrated in FIG. 11E. This is achieved by exposure of the fiber to a high peak power electromagnetic (EM) radiation, such as a pulsed laser. The EM radiation may be focused to a point or a localized region in the fiber core or cladding or both. Further, the EM radiation may be pulsed with a very short pulse width. The peak EM intensity at the focal point may exceed the fiber material 'damage', 'fracture' or 'melting' threshold to produce a localized fiber material discontinuity. The other regions of the fiber including the fiber coating may still remain intact without any damage because of significantly less EM intensity. The laser wavelength may be in the visible or near infrared or near ultra-violet spectrum. The PR reflectance may be controlled by the degree or the size of the glass damage, or by the radial position of the "damage" relative to the fiber core center.

Figure 12:
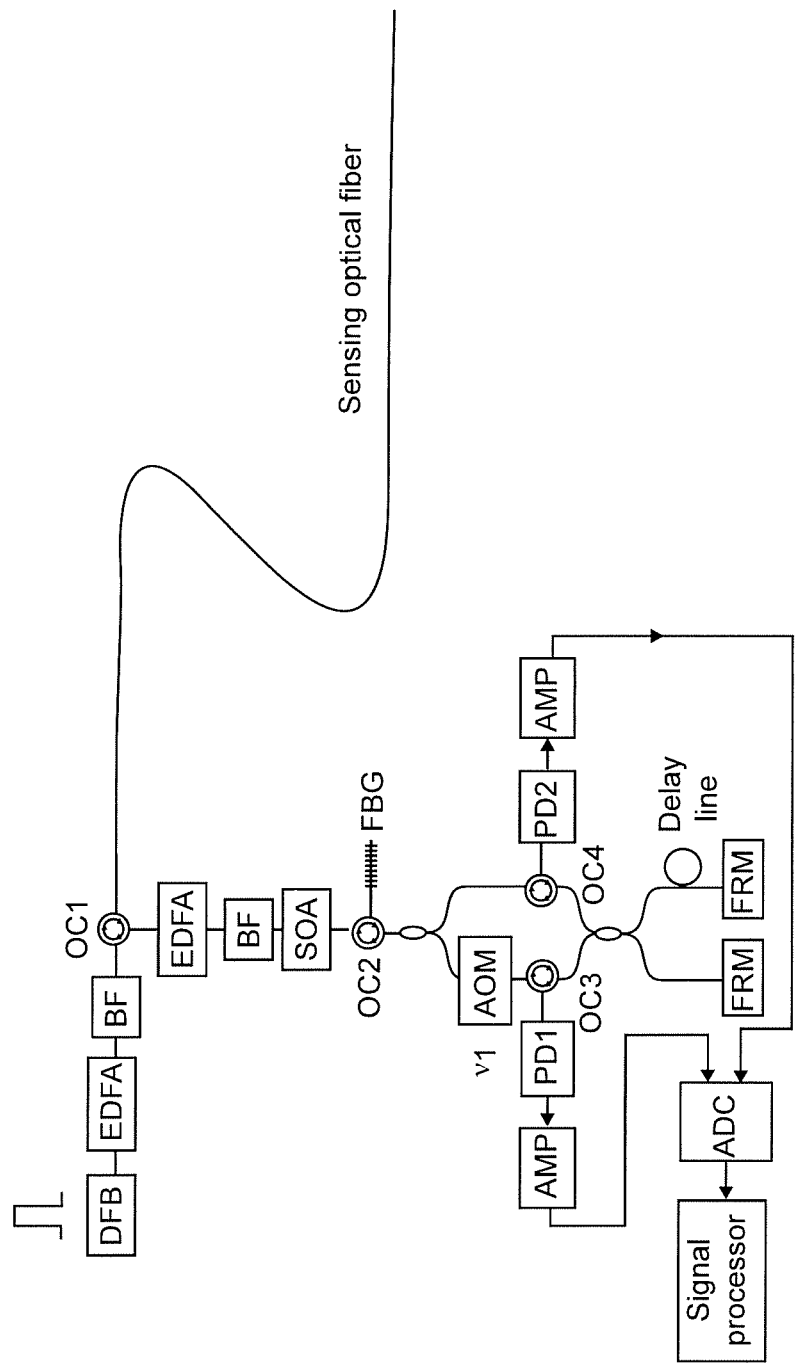
FIG. 12 illustrates a variant form of the embodiment of FIG. 1A for vibration or acoustic wave detection or measurement from Rayleigh backscatters rather than using discrete partial reflectors.

All the sensor systems described above operate on the interrogation of a sensing fiber that comprises serial PRs. When a laser pulse is injected into such a sensing fiber, reflections are produced by the discrete Prs. This mode of operation, while robust and greatly preferred is, however, not required for the successful practice of the invention. If the sensing fiber is replaced with an optical fiber that does not have artificial partial reflectors, an incident laser pulse can still produce back reflections via the Rayleigh scattering. These reflections are often called Rayleigh backscatters. Since the Rayleigh backscatters are generated in a distributed manner as the incident laser pulse propagates down the fiber, the backscatters are continuous although the backscatters may have fluctuations if the laser pulse is highly coherent. The AOM-based sensors as shown in FIGS. 7, 9 and 10 may be modified to be applicable to a sensing fiber that does not have artificial reflectors if the continuous wave (CW) Rayleigh backscatters are chopped into pulses. One way to do so is to add an optical shutter as shown in FIG. 12 where the optical shutter is an SOA based shutter. The function of the shutter is to chop the CW Rayleigh backscatters into serial pulses, which are similar to the reflections from the discrete PRs in the systems described above.

The optical shutter may include but is not limited to an SOA, an EOM, an AOM or an EAM. Here is an SOA shutter is used as an example. This SOA may also exhibit an optical gain. Additional optical amplifiers may or may not be utilized at both the light injection or reception end or both given that Rayleigh backscatters are generally weak. These optical amplifiers may include but are not limited to erbium-doped fiber amplifier (EDFAs), semiconductor optical amplifier (SOAs), Raman optical amplifier (ROAs) and Brillouin optical amplifier (BOAs).

A system modified from the one in FIG. 7 will now be explained in connection with FIG. 12. A diode laser serves as the light source. The laser may include but is not limited to a DFB laser, a VCSEL, a Fabry-Perot diode laser or a fiber laser. A light pulse may be generated via direct current modulation or via the use of an external modulator which may include but is not limited to an EOM, an AOM or an EAM, which may or may not be integrated into the laser package. The laser pulse is amplified by the first EDFA, which may be followed by an optical bandpass filter (BF) to suppress the EDFA ASE noise. After the first 3-port fiber circulator (OC1), which may be replaced by 2×2 fiber coupler, the light pulse is then launched into the sensing optical fiber, which may be a singlemode or multimode optical fiber. Rayleigh backscatters are produced as the pulse propagates down the sensing fiber. The backscatters are tapped off the sensing fiber by the OC1. These signals are amplified by the second EDFA, which may be followed by the second BF. A third EDFA may be used to further amplify the optical signals if necessary. The amplified Rayleigh backscatters are then chopped into pulses by the SOA shutter, and are split into two channels by a 1×2 or 2×2 fiber coupler. The combination of OC2 and the FBG function as a narrow band optical bandpass filter to filter out ASE noise from the SOA. The rest of the operation of this system is the same as the system shown in FIG. 7.

Figure 13:
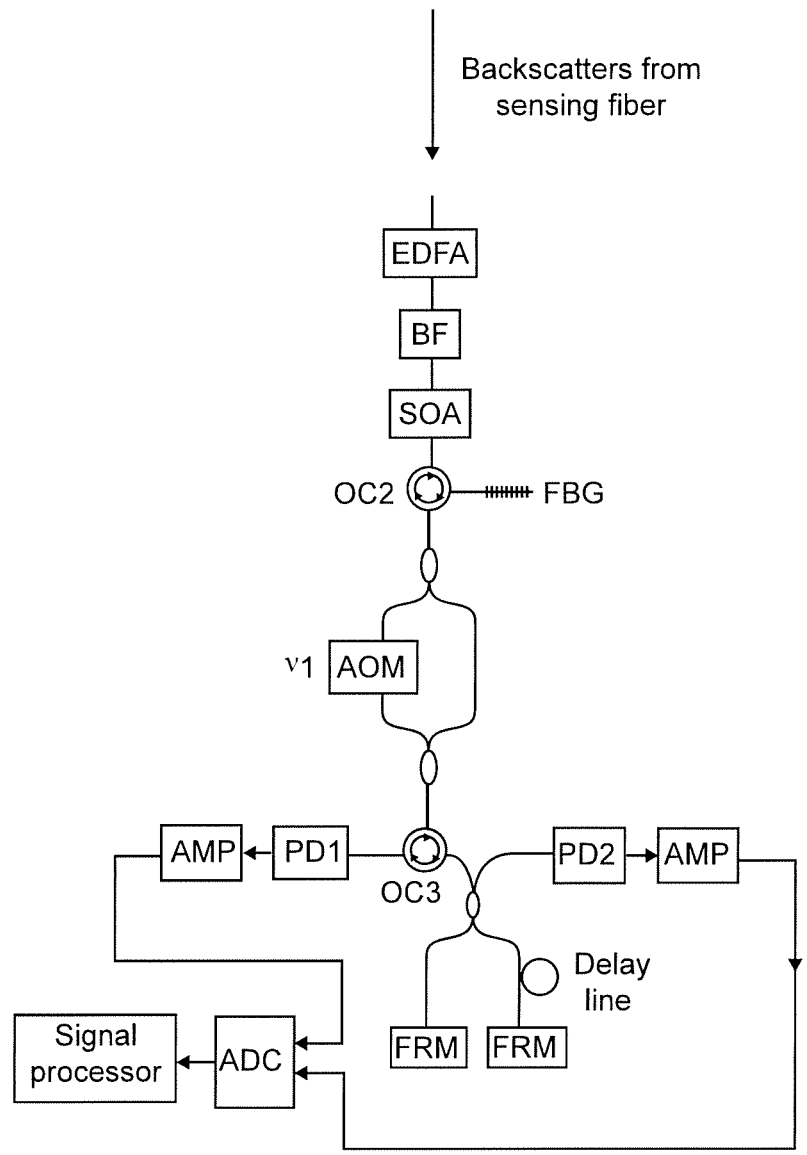

Similar to the modification of the system in FIG. 7 illustrated in FIG. 12 and described above, the systems shown in FIGS. 9 and 10 may also be modified to yield systems as depicted in FIGS. 13 and 14. The system illustrated in FIG. 13 shows elimination of one of the optical circulators of FIG. 12 while the system of FIG. 14 shows use of two frequency or wavelength shifts described in connection with FIG. 10.

Figure 15:
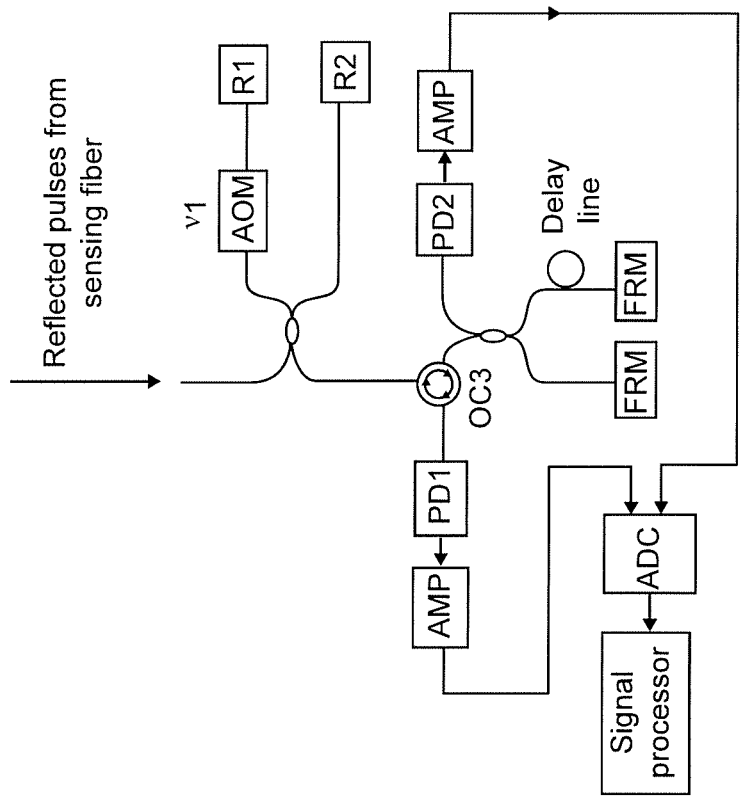
FIG. 15 illustrates replacement of Mach-Zehnder interferometers (MZI) with Michelson interferometers (MI) in various embodiments of the invention.

In some of the sensor systems described above, an MZI that utilizes one or two AOMs is used to produce optical signals at different frequencies before the signals enter into the MI. These MZIs may be replaced with an MI. For example, the system shown in FIGS. 9 and 13 may be changed to the one as presented in FIGS. 15. R1 and R2 are optical reflectors which may include but are not limited to FRMs or any optical reflectors that can reflect the incident light.

The sensor systems described above may permit measurement of any quantities that can be related to the relative optical phase between two reflections or Rayleigh backscatters that interfere with each other at the photodetection. Some of these quantities may include but are not limited to fiber strain, temperature, vibration or acoustic wave. In addition to these parameters, distributed measurement of other parameters may also be achieved when the sensing fiber is coated with a material that can generate an axial strain to the fiber when the coating material is exposed to these parameters. Exemplary measurements include but are not limited to distributed magnetic or electric fields by coating the fiber with magnetostrictive or piezoelectric materials. Even chemical and biological quantities may also be measured by fiber surface coatings. Some of the coating materials include but are not limited to palladium, platinum, etc. For instance, an optical fiber coated with palladium will experience an axial strain when the fiber is exposed to hydrogen gas.

Figure 16A:
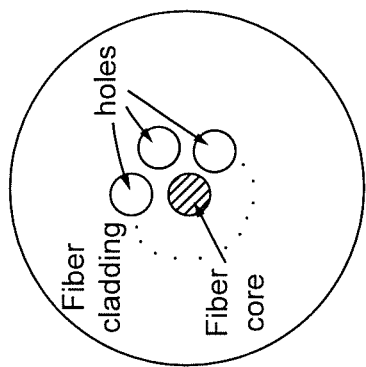
FIGS. 16A and 16B illustrate various preferred optical fiber structures for use in the invention.
Figure 16B:
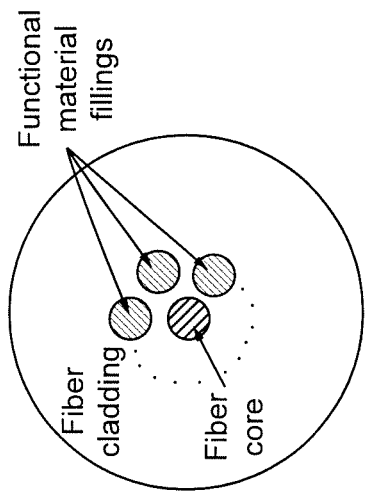

The sensing fiber may also have longitudinal holes that may be filled with air or any other chemical gas, which may or may not be an inert gas. When a pressure is externally applied, the fiber longitudinal dimension will change. The number of holes may vary, and the size of each hole and the hole distance from the fiber center may vary as well. The spatial separation between two neighboring holes may or may not be constant. These holes may also be filled with other functional materials, which may be liquids or solids, whose dimensions tend to change when they are exposed to a measurand. For example, if the holes are filled with a magnetostrictive or piezoelectric material, a longitudinal fiber strain is produced when the fiber is exposed to magnetic or electric fields. FIGS. 16A and 16B present some examples of fibers that have longitudinal holes that may be filled with gases including air, liquids, or solids. In addition, the fiber between two neighboring FGBs may also be attached to or wrapped on a material that can change its physical dimensions in response to an applied parameter such as magnetic or electric fields much in the manner of mandrels being subject to vibration and acoustic waves as alluded to above. With these designs, the present invention can also be utilized to measure many other quantities such as temperature, pressure and magnetic or electric fields. Also, the fiber may have a solid, liquid or air core, and the fiber cladding may be solid or may have orderly or random holes as shown in FIG. 16A In view of the foregoing, it is seen that the invention provides for robust interrogation of serial sequences of FPI sensors with good spatial resolution. Use of differing or shifted frequencies imposed on groups of optical pulses derived from a single optical pulse and causing optical interference provides an extremely sensitive response to changes in one or more OPDs due to conditions applied to the measurement optical fiber and thus provides for measurement of vibrations and acoustic waves with good fidelity and potentially high bandwidth.

While the invention has been described in terms of a single preferred embodiment, those skilled in the art will recognize that the invention can be practiced with modification within the spirit and scope of the appended claims.

The invention claimed is:

1. A method of measuring changes in a physical parameter, said method comprising steps of injecting a single one optical pulse into a sensing or measuring optical fiber, said single optical pulse having a physical length in said sensing or measuring optical fiber such that reflections of said single one optical pulse do not significantly overlap, detecting reflections or Rayleigh backscatters of light from said single optical pulse from at least two regions of said sensing or measurement optical fiber, shifting frequency of at least one detected reflection or Rayleigh backscatter;

superimposing said reflections or Rayleigh backscatters from said at least two regions of said sensing or measurement optical fiber to cause at least one pattern of optical interference, and detecting said at least one pattern of optical interference.

2. The method as recited in claim 1, wherein said sensing or measurement optical fiber includes a plurality of spatially separated partial reflectors, wherein said physical length is less than a distance between adjacent partial reflectors.

3. The method as recited in claim 2, wherein said partial reflectors are formed of fiber Bragg gratings.

4. The method as recited in claim 3, wherein said fiber Bragg grating is chirped.

5. The method as recited in claim 1, further comprising forming a plurality of optical pulses from said single optical pulse, wherein said injecting step injects said plurality of optical pulses into said sensing or measuring optical fiber timed such that only one injected light pulse is allowed to be present in said sensing or measurement optical fiber at any given time.

6. The method as recited in claim 1, further comprising a step of delaying one or more of said detected reflections or Rayleigh backscatters prior to said superimposing step.

7. The method as recited in claim 1, wherein said step of detecting said patterns of optical interference is performed by a Michelson interferometer.

8. The method as recited in claim 1, wherein said step of detecting said patterns of optical interference is performed by a Mach-Zehnder interferometer.

9. The method as recited in claim 1, wherein said physical parameter is a vibration or acoustic wave.

10. The method as recited in claim 1, further comprising steps of measuring an optical path difference between two reflectors of a reference Fabry-Perot interferometer, and calibrating said step of detecting said at least one pattern of optical interference in accordance with results of said measuring step.

11. The method as recited in claim 10, wherein said reference Fabry-Perot interferometer is separate from said sensing or measurement optical fiber.

12. The method as recited in claim 1, further comprising steps of measuring an optical path difference between two reflectors of a Fabry-Perot interferometer separate from said sensing or measurement optical fiber, and calibrating said sensing or measuring optical fiber in accordance with results of said measuring step.

13. Apparatus for sensing or measuring a physical parameter, said apparatus comprising a length of sensing or measurement optical fiber, a light source configured to inject a single light pulse into said length of said sensing or measurement optical fiber, said single light pulse having a physical length in said sensing or measuring optical fiber such that reflections of said light pulse do not significantly overlap, a splitter configured to split reflections or Rayleigh backscatters from said single light pulse into two separate paths, said reflections or Rayleigh backscatters containing light of at least two frequencies or wavelengths, an optical delay line configured to delay said reflections or Rayleigh backscatters in one of said two optical paths to form delayed reflections or Rayleigh backscatters, and a coupler configured to combine said reflections or Rayleigh backscatters with said delayed reflections or Rayleigh backscatters to cause an interference pattern for each of said at least two frequencies.

14. The apparatus as recited in claim 13, wherein said light source is a laser.

15. The apparatus as recited in claim 13, wherein said light source includes an optical arrangement for generating a plurality of light pulses of different frequencies or wavelengths from said single light pulse to form a light pulse group.

16. The apparatus as recited in claim 13, further including a continuous wave light source and a shutter to produce said single light pulse.

17. The apparatus as recited in claim 13, wherein said length of optical fiber includes microstructure comprising apertures that are filled with a gas, liquid or solid material including materials which are magnetostrictive or piezoelectric.

18. The apparatus as recited in claim 13, wherein said length of sensing or measurement optical fiber includes a plurality of spatially separated partial reflectors, wherein said physical length of said single light pulse is less than a distance between adjacent partial reflectors.

19. An interrogator for determining response of a length of sensing or measurement optical fiber to physical parameters in the environment of said sensing or measurement optical fiber, said interrogator comprising a light source configured to inject a single light pulse into said length of said sensing or measurement optical fiber, said single light pulse having a physical length in said sensing or measuring optical fiber such that reflections of said single light pulse do not significantly overlap, a splitter configured to split reflections or Rayleigh backscatters from said single light pulse into two separate paths, said reflections or Rayleigh backscatters containing light of at least two frequencies or wavelengths, an optical delay line configured to delay said reflections or Rayleigh backscatters in one of said two optical paths to form delayed reflections or Rayleigh backscatters, a coupler configured to combine said reflections or Rayleigh backscatters with said delayed reflections or Rayleigh backscatters to cause an interference pattern for each of said at least two frequencies.

20. An interrogator as recited in claim 19, wherein said light source includes an optical arrangement configured to generate a plurality of light pulses of different frequencies or wavelengths from said single light pulse to form a light pulse group.

* * * * *